United States Patent
Kanaya

(10) Patent No.: US 9,341,227 B2
(45) Date of Patent: May 17, 2016

(54) FLUID-FILLED VIBRATION DAMPING DEVICE

(71) Applicant: TOKAI RUBBER INDUSTRIES, LTD., Komaki-shi, Aichi (JP)

(72) Inventor: Tomohiro Kanaya, Kasugai (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/259,799

(22) Filed: Apr. 23, 2014

(65) Prior Publication Data

US 2014/0232049 A1    Aug. 21, 2014

Related U.S. Application Data

(63) Continuation of application No. PCT/JP2012/005409, filed on Aug. 28, 2012.

(30) Foreign Application Priority Data

Jan. 31, 2012   (JP) .................................. 2012-017661

(51) Int. Cl.
F16F 5/00       (2006.01)
F16F 13/10      (2006.01)

(52) U.S. Cl.
CPC .............. *F16F 13/10* (2013.01); *F16F 13/106* (2013.01); *F16F 13/107* (2013.01)

(58) Field of Classification Search
CPC ................................. F16F 13/10; F16F 13/107
USPC ................................. 267/140.11–140.13, 292
See application file for complete search history.

(56) References Cited

U.S. PATENT DOCUMENTS

| | | | |
|---|---|---|---|
| 4,657,232 A * | 4/1987 | West | 267/140.13 |
| 4,997,169 A | 3/1991 | Nakamura et al. | |
| 7,188,830 B2 | 3/2007 | Kato et al. | |

(Continued)

FOREIGN PATENT DOCUMENTS

| CN | 101311577 A | 11/2008 |
|---|---|---|
| JP | U-2-24142 | 2/1990 |

(Continued)

OTHER PUBLICATIONS

International Preliminary Report on Patentability issued in International Patent Application No. PCT/JP2012/005409 dated Aug. 5, 2014.

(Continued)

*Primary Examiner* — Robert A Siconolfi
*Assistant Examiner* — Mahbubur Rashid
(74) *Attorney, Agent, or Firm* — Oliff PLC

(57) ABSTRACT

A fluid-filled vibration damping device including an elastic buffer body supported by a partition member and arranged in a housing space such that at least one of wall inner surfaces of the housing space on sides of a pressure-receiving chamber and an equilibrium chamber is covered by the elastic buffer body. Windows are formed to penetrate the elastic buffer body at portions corresponding to communication holes formed in walls of the housing space so that the communication holes are narrowed by the windows of the elastic buffer body, and a ratio (a/l) of an opening area (a) of the windows to a penetration length (l) thereof is made smaller than a ratio (A/L) of an opening area (A) of the communication holes to a penetration length (L) thereof.

8 Claims, 13 Drawing Sheets

(56) References Cited

U.S. PATENT DOCUMENTS

| | | |
|---|---|---|
| 8,490,954 B2 | 7/2013 | Saito et al. |
| 8,556,239 B2 | 10/2013 | Okumura et al. |
| 2003/0080482 A1 | 5/2003 | Desmoulins et al. |
| 2005/0206056 A1 | 9/2005 | Maeno et al. |
| 2005/0258581 A1* | 11/2005 | Tanaka .................... 267/140.11 |
| 2008/0290573 A1 | 11/2008 | Katayama et al. |
| 2014/0175719 A1 | 6/2014 | Kanaya |
| 2014/0232049 A1 | 8/2014 | Kanaya |

FOREIGN PATENT DOCUMENTS

| | | |
|---|---|---|
| JP | A-2003-184939 | 7/2003 |
| JP | A-2004-003656 | 1/2004 |
| JP | A-2006-112607 | 4/2006 |
| JP | A-2006-144982 | 6/2006 |
| JP | A-2006-144983 | 6/2006 |
| JP | A-2006-250281 | 9/2006 |
| JP | A-2007-271001 | 10/2007 |
| JP | A-2008-196630 | 8/2008 |
| JP | A-2008-291969 | 12/2008 |
| JP | A-2009-085313 | 4/2009 |
| JP | A-2009-085344 | 4/2009 |
| JP | A-2009-222192 | 10/2009 |
| JP | A-2009-243510 | 10/2009 |
| WO | WO 2008/069131 | 6/2008 |

OTHER PUBLICATIONS

International Search Report issued in International Application No. PCT/JP2012/004723 mailed Nov. 6, 2012 (with translation).

U.S. Appl. No. 14/142,516.

International Search Report issued in International Application No. PCT/JP2012/005409 mailed Nov. 27, 2012.

Tomohiro Kanaya, Unpublished U.S. Appl. No. 14/335,153, filed Jul. 18, 2014.

International Search Report issued in International Patent Application No. PCT/JP2013/003512 mailed Aug. 6, 2013.

Jul. 1, 2014 International Preliminary Report on Patentability issued in International Application No. PCT/JP2012/004723.

May 20, 2015 Office Action issued in U.S. Appl. No. 14/335,153.

Mar. 30, 2015 Office Action issued in Chinese Application No. 201280065671.5.

* cited by examiner

FLUID-FILLED VIBRATION DAMPING DEVICE

INCORPORATED BY REFERENCE

The disclosure of Japanese Patent Application No. 2012-017661 filed on Jan. 31, 2012 including the specification, drawings and abstract is incorporated herein by reference in its entirety. This is a Continuation of International Application No. PCT/JP2012/005409 filed on Aug. 28, 2012.

BACKGROUND OF THE INVENTION

1. Field of the Invention

The present invention relates generally to a vibration damping device to be used, for example, for automotive engine mounts, body mounts, member mounts and the like, and more particularly, to a fluid-filled vibration damping device utilizing vibration damping effects based on the flow behavior of a fluid sealed therein.

2. Description of the Related Art

Conventionally, there has been known a fluid-filled vibration damping device as a vibration damping connecting body or a vibration damping supporting body interposed between the members constituting a vibration transmission system. The vibration damping device has a structure where a first mounting member and a second mounting member mounted to each member constituting the vibration transmission system are elastically connected by a main rubber elastic body. Also, the fluid-filled vibration damping device that utilizes the flow behavior of a fluid has been known as a vibration damping device. This fluid-filled vibration damping device has a structure where a pressure-receiving chamber and an equilibrium chamber are formed on either side of a partition member supported by the second mounting member and are filled with a non-compressible fluid sealed therein, and further, an orifice passage is formed to connect the pressure-receiving chamber and the equilibrium chamber with each other. For example, the one disclosed in Japanese Unexamined Patent Publication No. JP-A-2009-243510 is such a device.

Using the fluid-filled vibration damping device, a vibration damping effect is effectively obtained against vibration of frequency to which the orifice passage is tuned based on the flow behavior of the fluid, while such an effective vibration damping effect can hardly be obtained against vibration of frequencies outside the tuning frequency. Especially since the orifice passage is substantially shut off due to antiresonance when vibration with a frequency higher than the tuning frequency is inputted, a problem of degraded performance of vibration damping arises due to an increased dynamic spring constant.

For that reason, the structure described in JP-A-2009-243510 is proposed with a liquid-pressure transmission mechanism provided with a fluid passage that allows the liquid pressure to be transmitted between the pressure-receiving chamber and the equilibrium chamber when vibration with a frequency higher than the tuning frequency of the orifice passage is inputted. This liquid-pressure transmission mechanism has a specific structure where a movable member (movable plate) is housed in a housing space formed in the partition member, and the liquid pressures of the pressure-receiving chamber and the equilibrium chamber are each applied to either side of the movable member via the communication holes formed through the wall of the housing space. Then, during input of a high-frequency, small-amplitude vibration, the movable member undergoes a slight displacement or deformation to allow the liquid pressure to be transmitted between the pressure-receiving chamber and the equilibrium chamber, while during input of a vibration in the range of the tuning frequency of the orifice passage, the movable member shuts off the communication holes to prevent the liquid pressure from being transmitted between the pressure-receiving chamber and the equilibrium chamber. This makes it possible to obtain, selectively and effectively in each case, a vibration damping effect exerted by fluid flow through the orifice passage as well as a vibration damping effect exerted based on the liquid-pressure absorption action of the liquid pressure transmission mechanism.

However, in the fluid-filled vibration damping device provided with the liquid-pressure transmission mechanism described above, the striking noise generated by impact forces tends to become a problem when the movable member comes in contact with the inner face of the housing space. In other words, there is a risk of abnormal noise generated in the vehicular body by delivering the impact energy of the movable member coming into contact with the inner face of the housing space to the vehicular body via the partition member and the second mounting member in support thereof.

In addition, during input of vibration with even a higher frequency than the resonance frequency of the fluid flowing through the fluid flow channel, there was a problem of significantly degraded vibration damping performance caused by a rapidly increased dynamic spring constant, since not only the orifice passage but also the fluid flow channel is substantially shut off due to antiresonance.

SUMMARY OF THE INVENTION

It is therefore one object of this invention to provide a fluid-filled vibration damping device with a novel structure that can reduce the striking noise generated by the contact of the movable member, while obtaining a vibration damping effect over a broad range of frequencies in a stable manner.

That is, a first aspect of the present invention provides a fluid-filled vibration damping device comprising: a first mounting member; a second mounting member; a main rubber elastic body elastically connecting the first and second mounting members; a partition member supported by the second mounting member; a pressure-receiving chamber whose wall portion is partially defined by the main rubber elastic body; an equilibrium chamber whose wall portion is partially defined by a flexible film, the pressure-receiving chamber and the equilibrium chamber being disposed on either side of the partition member and filled with a non-compressible fluid; an orifice passage through which the pressure-receiving chamber and the equilibrium chamber communicate with each other; a housing space formed within the partition member; a movable member housed in the housing space with liquid pressure of the pressure-receiving chamber applied to one side of the movable member and liquid pressure of the equilibrium chamber applied to another side of the movable member through communication holes formed in walls of the housing space respectively on sides of the pressure-receiving chamber and the equilibrium chamber; and an elastic buffer body supported by the partition member and arranged in the housing space such that at least one of wall inner surfaces of the housing space on the sides of the pressure-receiving chamber and the equilibrium chamber is covered by the elastic buffer body, wherein windows are formed to penetrate the elastic buffer body at portions corresponding to the communication holes so that the communication holes are narrowed by the windows of the elastic buffer body, and a ratio (a/l) of an opening area (a) of the windows to a penetration length (l) thereof is made smaller than a ratio (A/L) of an opening area (A) of the communication holes to a penetration length (L) thereof.

According to the fluid-filled vibration damping device described in the first aspect, since the movable member comes in contact with the wall inner surface of the housing space via the elastic buffer body, the striking noise is reduced or prevented based on the energy attenuation effect caused by the internal friction of the elastic buffer body and the like.

Also, the communication holes are narrowed by the windows formed on the portions corresponding to the communication holes in the elastic buffer body so that the elastic buffer body extends over the communication hole openings, while the resonance frequency of the fluid flowing via the windows is set at a lower frequency than the resonance frequency of the fluid flowing through the communication holes. This causes the windows to be substantially shut off due to antiresonance and the like against a vibration input in the range of lower frequency than the vibration frequency at which the communication holes are substantially shut off due to antiresonance and the like. Moreover, since the pressures of the pressure-receiving chamber and the equilibrium chamber are applied to the portions extending over the openings of the elastic buffer body via the communication holes even with the windows shut, elastic deformation of the elastic buffer body is generated by pressure fluctuations of the pressure-receiving chamber relative to the equilibrium chamber. As a result of these, the pressure fluctuations of the pressure-receiving chamber are alleviated to prevent the dynamic spring constant from rapidly increasing and avoid significant reduction in the vibration damping (isolation) performance, thus maintaining the vibration damping performance in response to the vibration input over a broader range of frequencies.

A second aspect of the present invention provides the fluid-filled vibration damping device according to the first aspect, wherein the elastic buffer body is arranged under a condition of being in contact with and held by the wall inner surface of the housing space.

According to the second aspect, there is no need for treating the elastic buffer body with the adhesion process to the wall inner surface of the housing space. Also, abnormal noise caused by the elastic buffer body striking the wall inner surface of the housing space is prevented. In addition, since the elastic buffer body is held against the wall inner surface of the housing space in a contacted state, displacement of the movable member is not obstructed by the elastic buffer body separated from the wall inner surface of the housing space during vibration input, thus enabling to obtain a stroke of displacement for the movable member in a stable manner. Therefore, compactization of the partition member and even of the fluid-filled vibration damping device is achieved. Also, the communication holes are stably shut off by the movable member during the input of a low-frequency, large-amplitude vibration and the amount of fluid flowing through the orifice passage is efficiently obtained, thus effectively exerting the vibration damping effect based on the flow behavior of the fluid.

A third aspect of the present invention provides the fluid-filled vibration damping device according to the first or second aspect, wherein the wall inner surfaces on the sides of the pressure-receiving chamber and the equilibrium chamber are both covered by the elastic buffer body, and the communication holes formed in the respective walls on the sides of the pressure-receiving chamber and the equilibrium chamber are both narrowed by the windows of the elastic buffer body.

According to the third aspect, since the wall inner surfaces of the housing space on the sides of the pressure-receiving chamber and the equilibrium chamber are both covered by the elastic buffer body, the striking noise generated by the contact of the movable member against the wall of the housing space is more effectively prevented. In addition, each elastic buffer body covering the inner face of each of these walls is provided with a window with each elastic buffer body extending over the opening of the communication hole. This arrangement prevents the dynamic spring constant from significantly increasing owing to the elastic deformation of each elastic buffer body, thus stably exerting a vibration damping effect against a vibration input over a broad range of frequencies.

A fourth aspect of the present invention provides the fluid-filled vibration damping device according to the third aspect, wherein a difference is made between the ratio of the opening area to the penetration length of the window formed on the elastic buffer body covering the wall inner surface on the side of the pressure-receiving chamber and the ratio of the opening area to the penetration length of the window formed on the elastic buffer body covering the wall inner surface on the side of the equilibrium chamber.

According to the fourth aspect, as the frequency of the inputted vibration shifts toward a higher range, the window formed on the elastic buffer body covering the inner wall on the side of the pressure-receiving chamber and the window formed on the elastic buffer body covering the inner wall on the side of the equilibrium chamber are shut off sequentially due to the antiresonance. This allows the dynamic spring constant to gradually increase in multiple steps, thus effectively preventing significant deterioration of the vibration damping performance caused by a rapid increase in the dynamic spring constant.

A fifth aspect of the present invention provides the fluid-filled vibration damping device according to the first to fourth aspects, wherein the elastic buffer body comprises a pair of facing plate portions of a band-like cylindrical body by arranging the band-like cylindrical body integrally having the pair of facing plate portions and a pair of side plate portions that connect the pair of facing plate portions to each other in the housing space in a non-adhesive manner so that the pair of facing plate portions are in contact with the respective wall inner surfaces of the walls on the sides of the pressure-receiving chamber and the equilibrium chamber of the housing space.

According to the fifth aspect, since the movable member arranged in the inner space of the band-like cylindrical body (space surrounded by the pair of facing plate portions and the pair of side plate portions) is in contact with the wall inner surface of the movable member through the pair of facing plate portions, the striking noise generated by the contact of the movable member is effectively reduced. Moreover, since the band-like cylindrical body is arranged in the housing space in a non-adhesive manner, once the movable member comes in contact with one of the facing plate portions to input impact energy, the impact energy is delivered to the pair of side plate portions and the other facing plate portion. As a result, the impact energy is effectively attenuated by the energy attenuation effect based on internal frictions of the pair of side plate portions and the other facing plate portion, thus effectively reducing the striking noise generated by the contact by the movable member.

In addition, by arranging the band-like cylindrical body in the housing space in a non-adhesive manner, the elastic buffer body in contact with the wall inner surface of the housing space can easily be composed by the facing plate portions. This makes it possible to omit some manufacturing processes such as vulcanization adhesion of the elastic buffer body to the wall inner surface of the housing space, thus enabling to easily manufacture the fluid-filled vibration damping device relating to the present invention.

A sixth aspect of the present invention provides the fluid-filled vibration damping device according to any one of the first to fifth aspects, wherein a concave/convex portion is provided on at least one of the wall inner surfaces of the housing space on the sides of the pressure-receiving chamber and the equilibrium chamber, and a contact area is made small between the wall inner surface of the housing space provided with the concave/convex portion and the elastic buffer body.

In the structure of the present invention, the communication holes are narrowed at the windows to easily let the liquid pressures in the pressure-receiving chamber and the equilibrium chamber act in the direction of separating the elastic buffer body from the wall of the housing space, posing a risk of having the elastic body strike against the wall of the housing space after being separated therefrom to generate the striking noise by the contact of the elastic buffer body. In addition, at a vibration input in the range of frequencies that substantially shut off the windows, the vibration damping effect is exerted based on the liquid-pressure absorption action by means of elastically deforming the elastic buffer body in an aggressive manner. Under these circumstances, if the structure relating to the sixth aspect is adopted, the striking noise generated by the contact of the elastic buffer body is reduced because the contact area between the elastic buffer body and the inner wall of the housing space is made smaller.

A seventh aspect of the present invention provides the fluid-filled vibration damping device according to the sixth aspect, wherein the elastic buffer body is separated by the concave/convex portion from the wall inner surface of the housing space along opening edges of the communication holes.

According to the seventh aspect, since the elastic buffer body is allowed to undergo deformation without being restrained by the wall of the housing space along the opening edges of the communication holes, the elastic buffer body is elastically deformed more aggressively with the windows substantially shut off, thus exerting the vibration damping effect based on the liquid-pressure absorption action more favorably.

According to the present invention, the striking noise generated by the movable member coming in contact with the wall inner surface of the housing space is reduced by the energy attenuation effect based on inner frictions and the like of the elastic buffer body because of the provision of the elastic buffer body that covers the wall inner surface of the housing space.

Also, the communication holes are narrowed by the windows penetrating through portions of the elastic buffer body corresponding to the communication holes, which extends over the opening of the communication holes, while the windows are shut off at a vibration input of a lower frequency than that for the communication holes. Therefore, with the windows shut off, the pressure fluctuations of the pressure-receiving chamber are alleviated by means of having the elastic buffer body extending over the opening of the communication holes elastically deformed, thereby preventing significant reduction in the vibration damping performance due to a rapidly increased dynamic spring constant.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
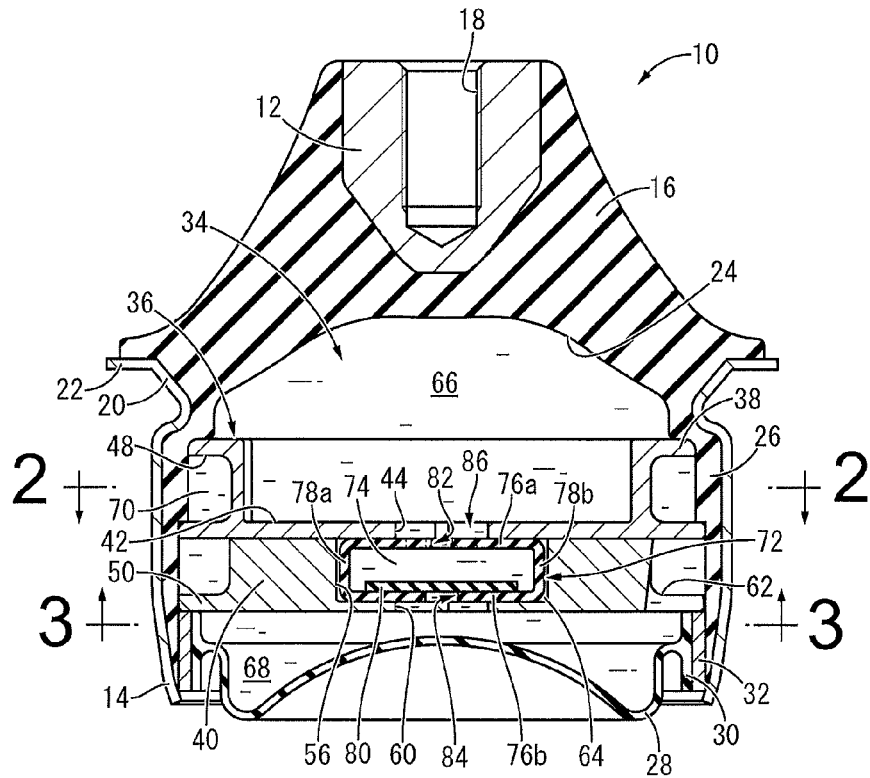
FIG. 1 is a longitudinal cross-sectional view showing a fluid-filled vibration damping device in the form of an engine mount as a first embodiment of the present invention, corresponding to the cross section taken along line 1-1 of FIG. 2.
Figure 2:
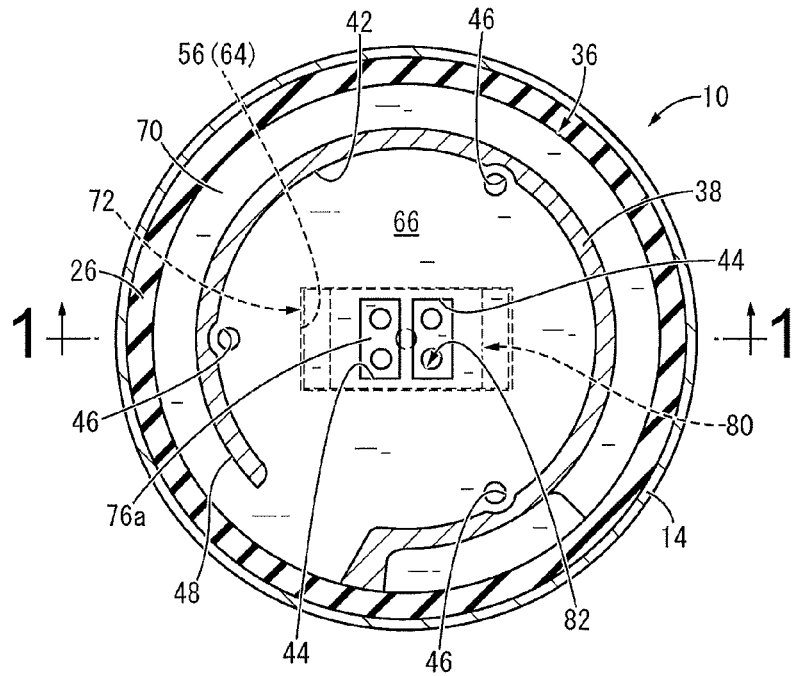
FIG. 2 is a cross-sectional view taken along line 2-2 of FIG. 1.
Figure 3:
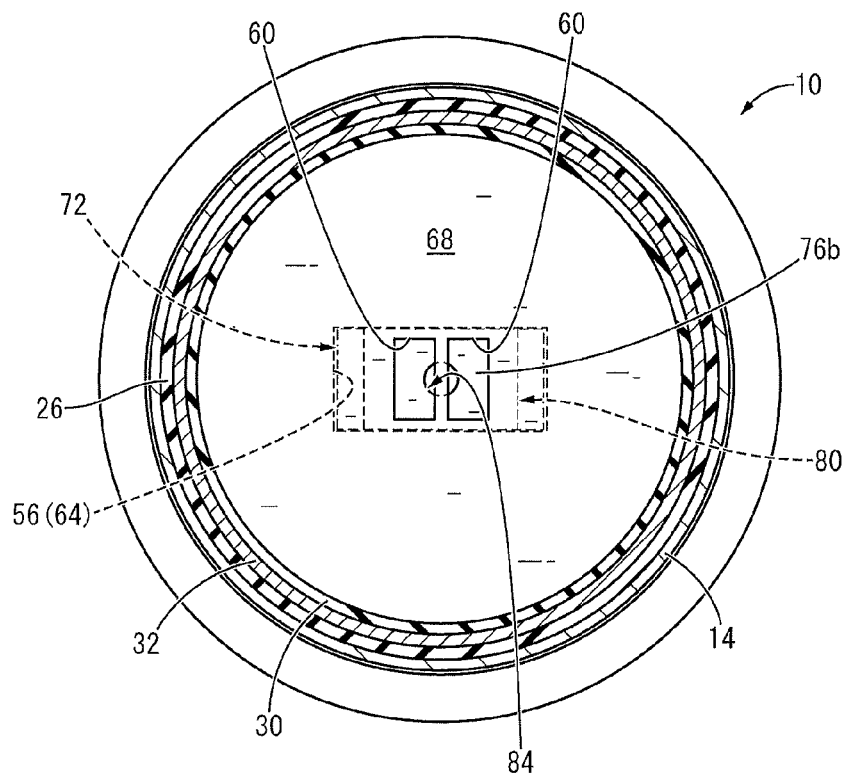
FIG. 3 is a cross-sectional view taken along line 3-3 of FIG. 1.

Embodiments of the present invention will be described in reference to the drawings as follows:

FIGS. 1 to 3 show an automotive engine mount 10 as a first embodiment of the fluid-filled vibration damping device with the structure according to the present invention. The engine mount 10 has a structure where a first mounting member 12 and a second mounting member 14 are elastically connected by a main rubber elastic body 16, wherein the first mounting member 12 is mounted to an unillustrated power unit while the second mounting member 14 is mounted to an unillustrated vehicular body. In the following descriptions, the "up-down direction" generally means the up-down direction in FIG. 1.

More specifically, the first mounting member 12 is a high-rigidity member made of iron or aluminum alloy or the like in an approximate shape of a small-diameter circular block as a whole with its upper portion in an approximate shape of a cylinder and its lower portion in an approximate shape of a truncated cone inverted upside down gradually reducing its diameter downward. Also, on the first mounting member 12, a bolt hole 18 is formed that extends in the up-down direction along the central axis to open on the top surface, wherein threads are formed along the inner peripheral surface.

The second mounting member 14 is a high-rigidity member made of a similar material to that of the first mounting member 12 in an approximate shape of a thin and large-diameter cylinder. Also, on the upper end of the second mounting member 14, a constricted portion 20 is provided in a form of a groove opening toward the outer periphery, while a flange portion 22 protrudes from the upper end of the constricted portion 20 toward the outer periphery.

Then, the first mounting member 12 and the second mounting member 14 are elastically connected by the main rubber elastic body 16 with the first mounting member 12 arranged above and away from the second mounting member 14 on the same central axis. The main rubber elastic body 16 is made in an approximate shape of a thick and large-diameter truncated cone and the first mounting member 12 is bonded by vulcanization to its small-diameter end, while the constricted portion 20 of the second mounting member 14 is overlapped and bonded by vulcanization to the outer periphery of its large-diameter end. In the present embodiment, the main rubber elastic body 16 is formed as an integrally vulcanization molded component provided with the first mounting member 12 and the second mounting member 14.

Furthermore, a large-diameter concave portion 24 is formed on the main rubber elastic body 16. The large-diameter concave portion 24 is a concavity in an approximate shape of an inverted bowl or dish opening to the large-diameter end face of the main rubber elastic body 16 located in the center thereof in the radial direction.

Moreover, a sealing rubber layer 26 extends from the outer periphery side of the large-diameter concave portion 24 of the main rubber elastic body 16. The sealing rubber layer 26 is a rubber elastic body in an approximate shape of a thin and large-diameter cylinder formed integrally with the main rubber elastic body 16, which is adhered to the inner peripheral surface of the second mounting member 14.

Also, a flexible film 28 is attached to the integrally vulcanization molded component of the main rubber elastic body 16. The flexible film 28 is a rubber membrane in a shape of a thin circular disc or dome provided with enough slack in the axial direction. In addition, the outer peripheral end of the flexible film 28 is formed integrally with a fixing portion 30 in an annular shape, and the outer peripheral surface of the fixing portion 30 is bonded by vulcanization to the inner peripheral surface of an annular fixing member 32.

Then, the fixing member 32 is fitted onto the second mounting member 14 by inserting the fixing member 32 into the lower opening of the second mounting member 14 and performing a diameter-reducing process on the second mounting member 14 so that the flexible film 28 is arranged to close the lower opening of the second mounting member 14. Between the second mounting member 14 and the fixing member 32, the sealing rubber layer 26 is interposed to fix the second mounting member 14 and the fixing member 32 in a fluid-tight manner.

By mounting the flexible film 28 to the integral vulcanization molding product of the main rubber elastic body 16 as described above, a fluid chamber 34 closed tight against the exterior containing a non-compressible fluid sealed therein is formed between the opposing faces of the main rubber elastic body 16 and the flexible film 28 in the axial direction. The non-compressible fluid sealed in the fluid chamber 34 is not particularly limited, but for example, water, alkylene glycol, polyalkylene glycol, silicone oil, or a mixture liquid thereof and the like can be adopted. Also, in order to efficiently obtain the vibration damping effect based on the flow behavior of the fluid described later, it is desirable to adopt a fluid of low viscosity at 0.1 Pa·s or lower.

Also, a partition member 36 is housed in the fluid chamber 34. The partition member 36 is in an approximate shape of a thick circular disc as a whole, and is composed to include an upper partition member 38 and a lower partition member 40.

Figure 4:
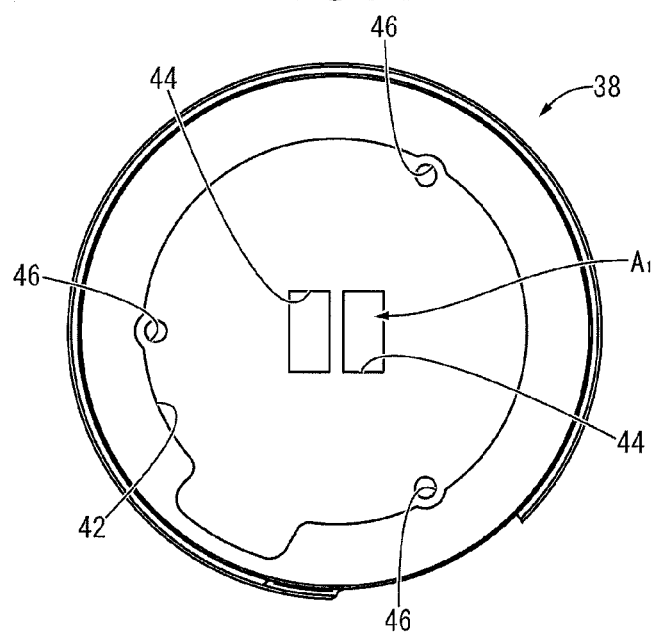
FIG. 4 is a plan view of an upper partition member of the engine mount shown in FIG. 1.
Figure 5:
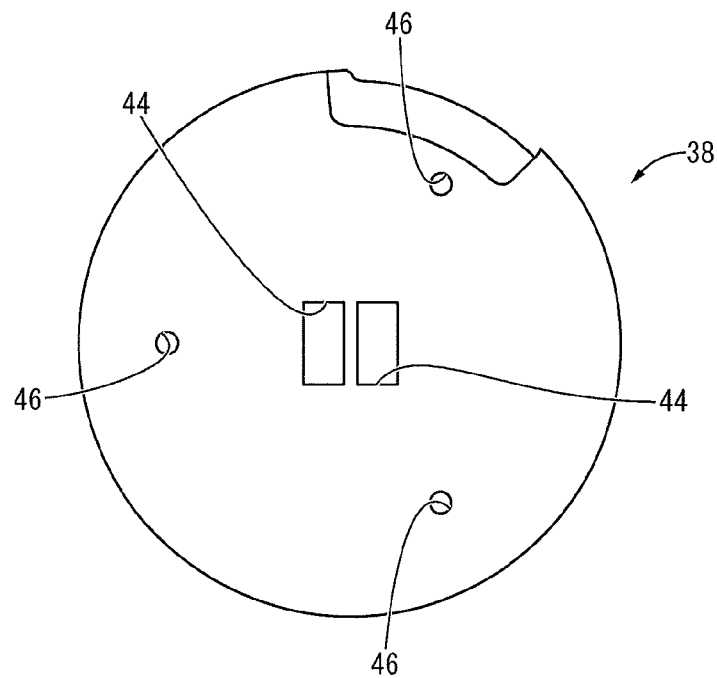
FIG. 5 is a bottom view of the upper partition member shown in FIG. 4.

As shown in FIGS. 1, 4 and 5, the upper partition member 38 is in an approximate shape of a circular disc, and a central concave 42 opening upward is formed in the center thereof in the radial direction to efficiently obtain the volume of a pressure-receiving chamber 66 described later. In addition, at the center of the bottom wall of the central concave 42, a first communication hole 44 is formed to penetrate therethrough in the up-down direction. The first communication hole 44 is made in an approximate shape of a rectangle in the axial view, and a pair of first communication holes 44, 44 are provided at a given distance from each other. On the outer periphery of the bottom wall of the central concave 42, a plurality of upper fit-in holes 46 are formed therethrough along the circumference.

In addition, at the outer peripheral end of the upper partition member 38, an upper groove 48 is formed extending over a given length in the circumferential direction and opening to the outer peripheral surface. One end of the upper groove 48 extends inward in the radial direction to communicate with the central concave 42, while the other end opens to the bottom surface.

Figure 6:
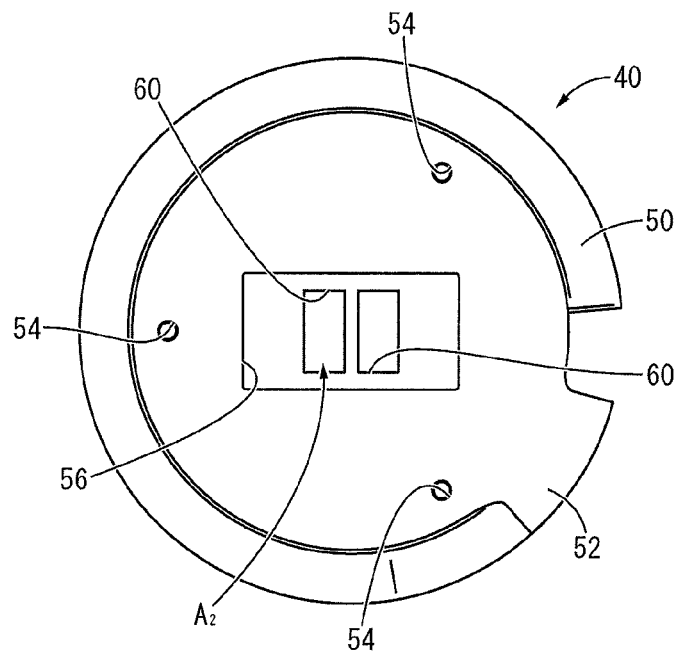
FIG. 6 is a plan view of a lower partition member of the engine mount shown in FIG. 1.
Figure 7:
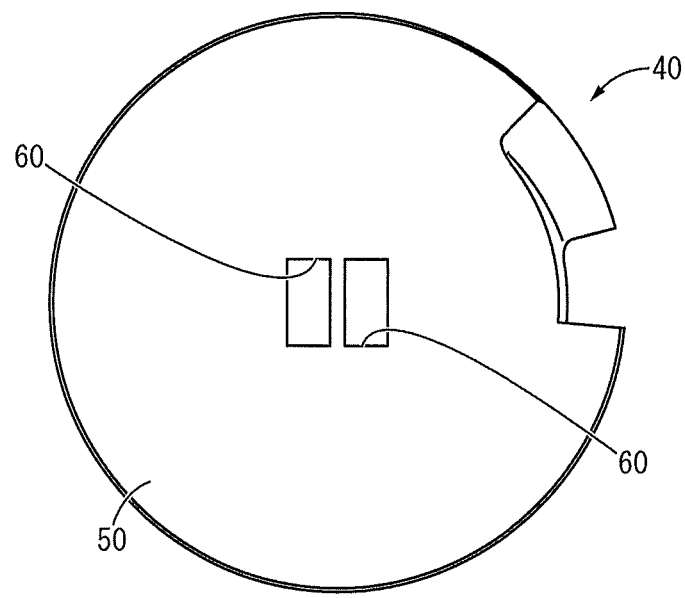
FIG. 7 is a bottom view of the lower partition member shown in FIG. 6.
Figure 8:
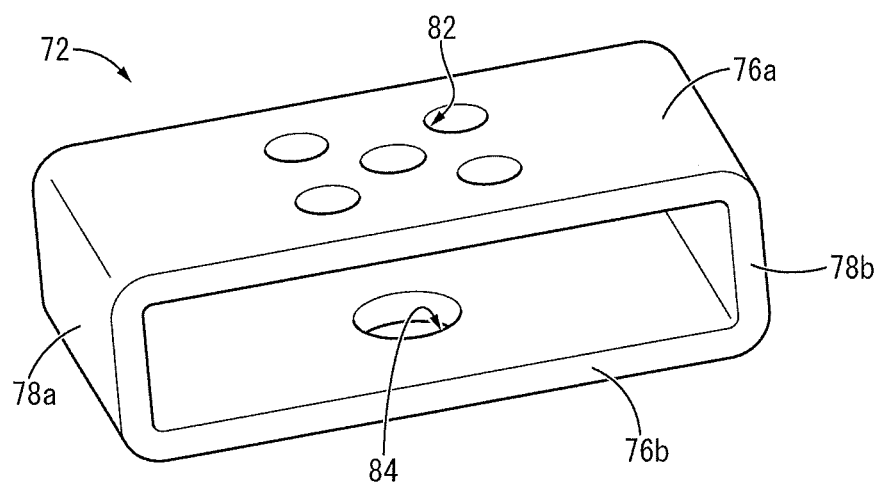
FIG. 8 is a perspective view of a rubber buffer of the engine mount shown in FIG. 1.

As shown in FIGS. 1, 6 and 7, the lower partition member 40 has its central portion in an approximate shape of a thick circular plate, while a thin flange-shaped portion 50 protrudes from the bottom end along the outer periphery. The flange-shaped portion 50 extends in the circumferential direction over a given length for less than one round, one end of which is made to be a slope with gradually increasing thickness outward in the circumferential direction while the other end opens downward in the axial direction. In addition, between both ends of the flange-shaped portion 50, a bulkhead portion 52 protrudes with the same thickness as the central portion. In the thick central portion, a plurality of lower fit-in holes 54 are formed at equal intervals along the periphery.

Also, at the center of the lower partition member 40 in the radial direction, a housing concave 56 is formed. The housing concave 56 is a concavity that extends in the axial direction with an approximately constant rectangular cross section opening to the top surface of the lower partition member 40.

In addition, a pair of second communication holes 60, 60 are formed through the bottom wall of the housing concave 56. The second communication hole 60 extends in the up-down direction with approximately the same rectangular cross section as that of the first communication hole 44, and is provided in a pair at a given distance from each other in the short-side direction as is the case with the first communication hole 44. The second communication hole 60 is provided with its long-side direction nearly coinciding with the short-side direction of the housing concave 56, and under a combined condition of the upper and lower partition members 38, 40 described later, the long-side direction of the first communication hole 44 and the long-side direction of the second communication hole 60 nearly coincide with each other.

Then, the upper partition member 38 and the lower partition member 40 are overlapped and fixed to each other by the pins pressed into the upper fit-in holes 46 and the lower fit-in holes 54 positioned relative to each other or by the screws tightened therein. Also by arranging the lower wall of the upper groove 48 of the upper partition member 38 opposite and above the flange-shaped portion 50 of the lower partition member 40 at a distance, a concave groove is formed to extend in the circumferential direction opening toward the outer periphery, and by having the concave groove and the upper groove 48 communicated to each other at the end in the circumferential direction, a peripheral groove 62 is formed to extend in a helical form for a length of less than two rounds in the circumferential direction. In addition, by covering the opening of the housing concave 56 of the lower partition member 40 by the upper partition member 38, a housing space 64 is formed between the upper and lower partition members 38, 40. The first communication hole 44 is formed through the upper wall of the housing space 64, while the second communication hole 60 is formed through the lower wall of the housing space 64.

The partition member 36 with the structure described above is housed in the fluid chamber 34 to extend in the axis-perpendicular direction with its outer peripheral end supported by the second mounting member 14. This allows the fluid chamber 34 to be vertically divided into two sections across the partition member 36, and in the upper section across therefrom, the wall is partially composed of the main rubber elastic body 16 so as to form the pressure-receiving chamber 66 where internal pressure fluctuations are induced at a vibration input. Meanwhile, in the lower section across from the partition member 36, the wall is partially composed of the flexible film 28 so as to form an equilibrium chamber 68 that readily allows volume changes due to deformation of the flexible film 28. The pressure-receiving chamber 66 and the equilibrium chamber 68 are filled with the above-mentioned non-compressible fluid.

Also, by overlapping the outer peripheral surface of the partition member 36 with the second mounting member 14 through the sealing rubber layer 26, the outer peripheral opening of the peripheral groove 62 is shut off by the second mounting member 14 in a fluid-tight manner to form a tunnel-like flow channel that extends in the circumferential direction. One end of the tunnel-like flow channel in the circumferential direction is communicated with the pressure-receiving chamber 66, while the other end in the circumferential direction is communicated with the equilibrium chamber 68, thereby forming an orifice passage 70 through which the pressure-receiving chamber 66 and the equilibrium chamber 68 communicate with each other using the peripheral groove 62. The orifice passage 70 is tuned to a low frequency around 10 Hz, which is equivalent to the engine shake, by means of adjusting the ratio (A'/L') of the passage cross sectional area (A') to the passage length (L') taking into account the rigidity of the wall springs in the pressure-receiving chamber 66 and the equilibrium chamber 68.

Also, in the housing space 64, a rubber buffer 72 as shown in FIGS. 8 to 11 is housed as a band-like cylindrical body. The rubber buffer 72 is a hollow structure formed with a rubber elastic body in an approximate shape of a rectangle in the axial view (up-down view in FIG. 10), while in the present embodiment, an inner space 74 is provided therein penetrating through the rubber buffer 72 in the short-side direction (up-down direction in FIG. 9).

More specifically, the rubber buffer 72 integrally comprises a pair of facing plate portions 76a, 76b as an elastic buffer body and a pair of side plate portions 78a, 78b that connect the pair of facing plate portions 76a, 76b to each other, thereby forming an approximate shape of a band-like cylinder as a whole.

The pair of facing plate portions 76a, 76b are plates in an approximate shape of a rectangle corresponding to each other in the axial view and are arranged to oppose vertically to each other at a given distance from each other. At each end of the pair of facing plate portions 76a, 76b in the long-side direction, the pair of side plate portions 78a, 78b are integrally formed to extend out inward in the opposing direction of the pair of facing plate portions 76a, 76b. This allows the pair of facing plate portions 76a, 76b to be connected to each other by the pair of side plate portions 78a, 78b to form the rubber buffer 72 in a shape of a band-like cylinder, while the inner space 74 is formed surrounded by the pair of facing plate portions 76a, 76b as well as the pair of side plate portions 78b, 78b.

In the inner space 74 of the rubber buffer 72, a movable plate 80 is arranged as a movable member. The movable plate 80, a member in a shape of a rectangle plate formed with elastic rubber body, synthetic resin, metal or the like, is formed separately from the rubber buffer 72 and is housed in the inner space 74 under a condition that allows relative displacement independent of the rubber buffer 72. The movable plate 80 is made smaller than the distance between the opposing faces of the side plate portions 78a, 78b in the long-side direction, while being made in the same size as the facing plate portions 76a, 76b as well as the side plate portions 78a, 78b in the short-side direction.

Then, the rubber buffer 72 is arranged in a non-adhesive manner in the housing space 64 provided in the interior of the partition member 36, and the movable plate 80 stored in the inner space 74 of the rubber buffer 72 is arranged in the housing space 64. In other words, the rubber buffer 72 is inserted into the housing concave 56 of the lower partition member 40 in a non-adhesive manner, and the rubber buffer 72 is housed in the housing space 64 by having the upper partition member 38 overlapped and fixed to the lower partition member 40. This allows the wall inner surface of the housing space 64 on the side of the pressure-receiving chamber 66 to be covered by the facing plate portion 76a and the wall inner surface of the housing space 64 on the side of the equilibrium chamber 68 to be covered by the facing plate portion 76b.

Furthermore, the facing plate portion 76a of the rubber buffer 72 is overlapped and placed in contact with the wall inner surface of the housing space 64 on the side of the pressure-receiving chamber 66 in a non-adhesive manner, and the facing plate portion 76a extends over the opening of the first communication hole 44. Moreover, the facing plate portion 76b of the rubber buffer 72 is overlapped and placed in contact with the wall inner surface of the housing space 64 on the side of the equilibrium chamber 68 in a non-adhesive manner, and the facing plate portion 76b extends over the opening of the second communication hole 60. The rubber buffer 72 is in contact with and held by the partition member 36 under a positioned condition in the housing space 64 by having the facing plate portions 76a, 76b come in contact with the wall inner surface of the housing space 64.

Figure 9:
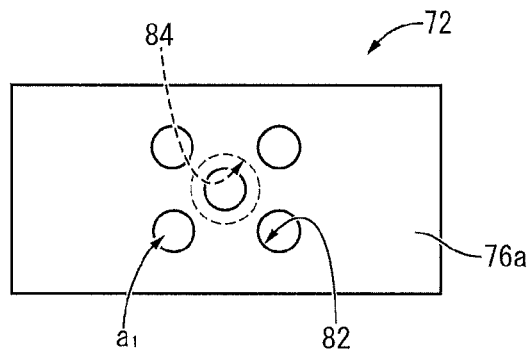
FIG. 9 is a plan view of the rubber buffer shown in FIG. 8.
Figure 10:
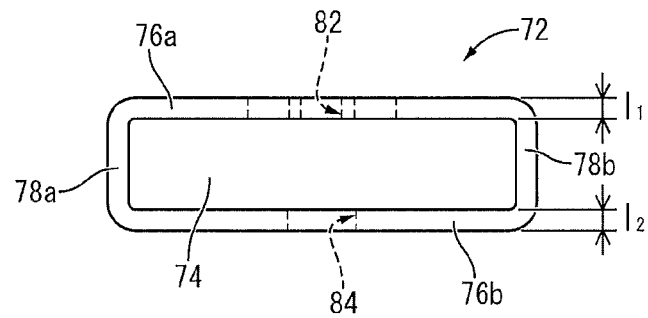
FIG. 10 is a front view of the rubber buffer shown in FIG. 9.

Also, a first window 82 as a window is formed on the facing plate portion 76a at a portion corresponding to the first communication hole 44, that is, a portion that extends over the opening of the first communication hole 44. As shown in FIG. 9, the first window 82 is composed of five small-diameter circular holes independent of one another and formed to penetrate through the facing plate portion 76a in the thickness direction. The circular holes composing the first window 82 have nearly the same shape and size as one another.

Figure 11:
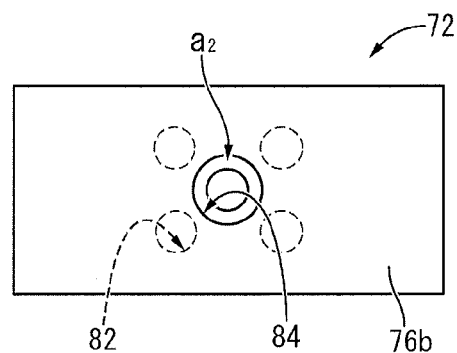
FIG. 11 is a bottom view of the rubber buffer shown in FIG. 9.

In addition, a second window 84 as a window is formed on the facing plate portion 76b at a portion corresponding to the second communication hole 60, that is, a portion that extends over the opening of the second communication hole 60. As shown in FIG. 11, the second window 84 is composed of one circular hole and formed to penetrate through the center of the facing plate portion 76b in the thickness direction. The opening area of the second window 84 is made larger than that of each circular hole composing the first window 82 and smaller than the total opening area of the first window 82 (sum of opening areas of five circular holes).

Then, by arranging the rubber buffer 72 in the housing space 64, the first window 82 of the rubber buffer 72 is positioned with respect to the first communication hole 44 of the upper partition member 38 to be communicated with each other, while the second window 84 of the rubber buffer 72 is positioned with respect to the second communication hole 60 of the lower partition member 40 to be communicated with each other. This allows a fluid flow channel 86 through which the pressure-receiving chamber 66 and the equilibrium chamber 68 communicate with each other including the first and second communication holes 44, 60, the first and second windows 82, 84, the housing space 64, and the inner space 74.

Along the fluid flow channel 86 is arranged the movable plate 80 that extends nearly perpendicular to the channel length direction of the fluid flow channel 86 (up-down direction in FIG. 1). This causes the liquid pressure in the pressure-receiving chamber 66 to be applied to the top surface of the movable plate 80 through the first communication hole 44 and the first window 82, and causes the liquid pressure in the equilibrium chamber 68 to be applied to the bottom surface of the movable plate 80 through the second communication hole 60 and the second window 84. This allows the movable plate 80 to be displaced vertically within the inner space 74 based on the relative pressure fluctuations of the pressure-receiving chamber 66 and the equilibrium chamber 68.

The movable plate 80 extends to the outer side beyond the first window 82 and the second window 84 in the long-side and short-side directions of the facing plate portions 76a, 76b. Also, the movable plate 80 is formed in a size that allows its outer peripheral end to be held positioned outside the first window 82 and the second window 84 even when displaced within the inner space 74 in the surface direction thereof (perpendicular to the thickness direction), and the first window 82 and the second window 84 as a whole are overlapped with the movable plate 80 in the axial projection.

Then, at the input of a medium-frequency, small-amplitude vibration equivalent to the idling vibration, liquid pressure is transmitted between the pressure-receiving chamber 66 and the equilibrium chamber 68 by a slight vertical displacement of the movable plate 80 within the inner space 74, while at the input of a low-frequency, large-amplitude vibration, the movable plate 80 shuts off the fluid flow channel 86 by closing either the first window 82 or the second window 84 so as to prevent transmission of the liquid pressure through the fluid flow channel 86. In summary, in the present embodiment, the liquid-pressure transmission mechanism whereby the liquid pressure in the pressure-receiving chamber 66 is transmitted to the equilibrium chamber 68 at the input of a medium-frequency, small-amplitude vibration is composed to include the movable plate 80. Although the tuning frequency of the fluid flow channel 86 is set within a range of medium frequencies equivalent to the idling vibration in the present embodiment, it can be set within a range of high frequencies equivalent to the driving rumble and the like.

Under these circumstances, each circular hole composing the first window 82 is formed with a smaller opening area than that of the first communication hole 44, and the first communication hole 44 is narrowed by the first window 82 under a condition where the rubber buffer 72 is arranged in the housing space 64 (see FIG. 2). Also, the second window 84 is formed with a smaller opening area than that of the second communication hole 60, and the second communication hole 60 is narrowed by the second window 84 under a condition where the rubber buffer 72 is arranged in the housing space 64 (see FIG. 3). This allows the facing plate portion 76a to extend over the opening of the first communication hole 44 and the facing plate portion 76b to extend over the opening of the second communication hole 60.

In addition, the value obtained by dividing the sum of the total opening area $a_1$ of the first window 82 and the total opening area $a_2$ of the second window 84 by the sum of the penetration length $l_1$ of the first window 82 and the penetration length $l_2$ of the second window 84 $((a_1+a_2)/(l_1+l_2))$ is made smaller than the value obtained by dividing the sum of the total opening area $A_1$ of the first communication hole 44 and the total opening area $A_2$ of the second communication hole 60 by the sum of the penetration length $L_1$ of the first communication hole 44 and the penetration length $L_2$ of the second communication hole 60 $((A_1+A_2)/(L_1+L_2))$, which is expressed by $(a_1+a_2)/(l_1+l_2)<(A_1+A_2)/(L_1+L_2)$. In summary, the ratio of the opening area a of the windows 82, 84 to the penetration length l thereof (a/l) is made smaller than the ratio of the opening area A of the communication holes 44, 60 to the penetration length L thereof (A/L). In the present embodiment, the value of $a_1/l_1$ is made smaller than both of $A_1/L_1$ and $A_2/L_2$, while the value of $a_2/l_2$ is made smaller than both of $A_1/L_1$ and $A_2/L_2$.

This makes the resonance frequency of the fluid flowing through the first and second windows 82, 84 set lower than the resonance frequency of the fluid flowing through the first and second communication holes 44, 60, causing substantial closure of the first and second windows 82, 84 due to the anti-resonance at a vibration input in a frequency range lower than that for the first and second communication holes 44, 60.

Furthermore, the opening area $a_1$ of the first window 82 is made larger than the opening area $a_2$ of the second window 84 $(a_1>a_2)$, while the thickness of the facing plate portion 76a is made nearly the same as the thickness of the facing plate portion 76b, and the penetration length $l_1$ of the first window 82 is made the same as the penetration length $l_2$ of the second window 84 ($l_1=l_2$). This makes the ratio of the opening area of the first window 82 to the penetration length thereof ($a_1/l_1$) larger than the ratio of the opening area of the second window 84 to the penetration length thereof ($a_2/l_2$), which is expressed by $a_1/l_1 > a_2/l_2$.

This makes the resonance frequency of the fluid flowing through the second window 84 set lower than the resonance frequency of the fluid flowing through the first window 82, causing substantial closure of the second window 84 due to the antiresonance at a vibration input in a frequency range lower than that for the first window 82.

In summary, as the frequency of the input vibration shifts from a lower to higher range, the second window 84 is first shut off substantially, and then the first window 82 is substantially shut off, and finally the first and second communication holes 44, 60 are substantially shut off.

The engine mount 10 with the structure described above is mounted on a vehicle by having the first mounting member 12 mounted to an unillustrated power unit and the second mounting member 14 mounted to an unillustrated vehicular body so as to connect the power unit and the vehicular body to each other in a vibration damping manner.

In such a state of mounting on the vehicle, once a low-frequency, large-amplitude vibration at about 10 Hz equivalent to the engine shake is inputted, fluid flow through the orifice passage 70 is induced based on relative pressure fluctuations between the pressure-receiving chamber 66 and the equilibrium chamber 68. This allows the intended vibration damping effect (high attenuation effect) to be achieved based on the flow behavior of a fluid such as resonance actions and the like.

Since the amount of vertical displacement of the movable plate 80 increases at the input of a low-frequency, large-amplitude vibration, the movable plate 80 is pressed against the pair of facing plate portions 76a, 76b to be substantially restrained. This causes either the first or second windows 82, 84 to be closed by the movable plate 80 to shut off the fluid flow channel 86 so that liquid pressure in the pressure-receiving chamber 66 is prevented from being transmitted to the side of the equilibrium chamber 68 through the fluid flow channel 86. Therefore, internal pressure fluctuations of the pressure-receiving chamber 66 is efficiently induced and an enough amount of fluid can be obtained to flow through the orifice passage 70, thus effectively exerting the vibration damping effect based on the flow behavior of a fluid. In summary, in the liquid-pressure transmission mechanism of the present embodiment, the liquid pressure transmission is turned on and off between the pressure-receiving chamber 66 and the equilibrium chamber 68 by the liquid-pressure transmission mechanism by means of switching between the state of communication and shut-off of the fluid flow channel 86 by the movable plate 80.

Under these circumstances, the impact forces generated by the movable plate 80 when coming in contact with the upper and lower wall inner surfaces of the housing space 64 are absorbed by the rubber buffer 72. In other words, when the movable plate 80 comes in contact with the upper wall inner surface of the housing space 64 through the facing plate portion 76a, the impact energy inputted to the facing plate portion 76a at the time of contact is transmitted to the facing plate portion 76b through the pair of side plate portions 78a, 78b. In that case, the pair of side plate portions 78a, 78b and the facing plate portion 76b are subject to slight deformation due to the inputted impact energy so that the impact energy is converted into thermal energy based on internal frictions of the facing plate portion 76b and the pair of side plate portions 78a, 78b and the like. This causes the impact energy to be transmitted to the partition member 36 through the rubber buffer 72 to be reduced so that the generation of the striking noise caused by the impact energy can be reduced or avoided. In cases where the movable plate 80 comes in contact with the lower wall inner surface of the housing space 64 through the facing plate portion 76b, a similar energy attenuation effect is exerted by transmitting the impact energy inputted to the facing plate portion 76b to the facing plate portion 76a through the pair of side plate portions 78a, 78b, thus preventing generation of the striking noise.

Furthermore, by means of separating the pair of side plate portions 78a, 78b from the inner peripheral surface of the housing space 64, slight deformation of the pair of side plate portions 78a, 78b is effectively generated to achieve efficient transmission of the impact energy between the pair of facing plate portions 76a, 76b, while the energy attenuation effect of the side plate portions 78a, 78b is effectively exerted.

Figure 12A:
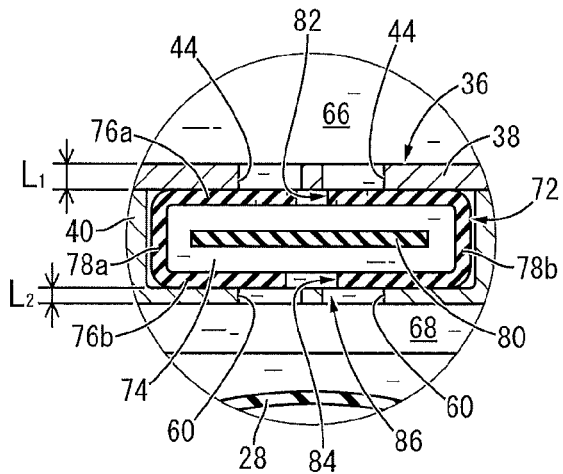
FIGS. 12A and 12B are longitudinal cross-sectional views each showing an enlarged key portion of the engine mount shown in FIG. 1, where FIG. 12A indicates a condition of inputting a comparatively low-frequency vibration, FIG. 12B indicates a condition of inputting a vibration of frequency higher than FIG. 12A and lower than FIG. 12C, and FIG. 12C indicates a condition of inputting a comparatively high-frequency vibration.

Also, once a medium-frequency, small-amplitude vibration equivalent to the frequency of idling vibration is inputted, the orifice passage 70 is substantially shut off due to the antiresonance caused by an input of vibration at a higher frequency than the tuning frequency. Meanwhile, the movable plate 80 moves away from the pair of facing plate portions 76a, 76b within the inner space 74 to be slightly displaced vertically based on the relative pressure fluctuations of the pressure-receiving chamber 66 and the equilibrium chamber 68 (see FIG. 12A). This allows the fluid flow channel 86 to be maintained in a communicated state and the liquid pressure of the pressure-receiving chamber 66 is transmitted to the equilibrium chamber 68 through the fluid flow channel 86 so that the liquid-pressure absorption action caused by volume changes of the equilibrium chamber 68 is exerted, thereby obtaining the intended vibration damping (isolation) effect. As evident from the above description, the liquid-pressure transmission mechanism of the present embodiment is composed of the fluid flow channel 86 with the movable plate 80 arranged thereon.

Figure 12B:
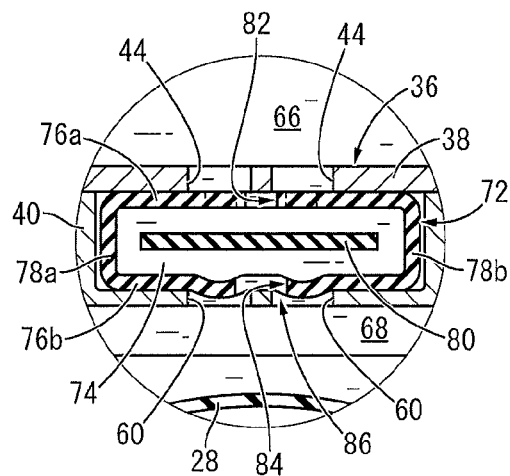
Figure 12C:
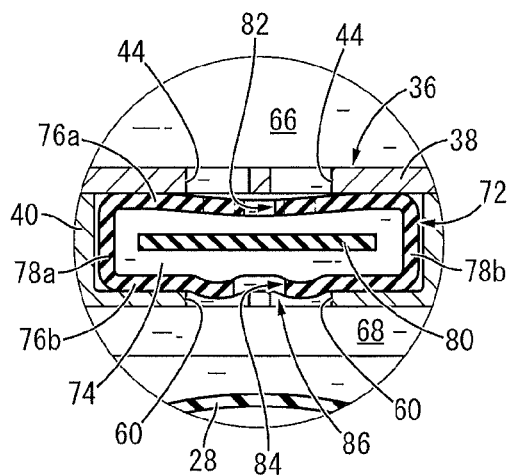

Also, at the vibration input of even a higher frequency than the idling vibration, vibration damping effect based on the liquid-pressure absorption action is exerted due to elastic deformation of the facing plate portions 76a, 76b of the rubber buffer 72 as shown in FIGS. 12B and 12C.

More specifically, at the vibration input of a frequency lower than the tuning frequency of the first window 82 and higher than the tuning frequency of the second window 84, the first window 82 is maintained in a communicated state, while the second window 84 is substantially shut off. Then, the liquid pressure in the pressure-receiving chamber 66 is applied to the top surface of the portion extending over the second communication hole 60 (opening edge of second window 84) of the facing plate portion 76b through the first communication hole 44 and the first window 82, while the liquid pressure in the equilibrium chamber 68 is applied to the bottom surface of the portion extending over the second communication hole 60 of the facing plate portion 76b through the second communication hole 60. This allows the facing plate portion 76b to generate elastic deformation corresponding to the internal pressure fluctuations of the pressure-receiving chamber 66, as shown in FIG. 12B to cause the liquid pressure in the pressure-receiving chamber 66 to be absorbed based on the volume changes of the equilibrium chamber 68. As a result, any increase in the dynamic spring constant due to the tight closure of the pressure-receiving chamber 66 can be avoided to obtain an effective vibration isolation effect.

In addition, as shown in FIG. 12C, at the vibration input of a frequency lower than the tuning frequency of the first and second communication holes 44, 60 and higher than the tuning frequency of the first window 82, the facing plate portions 76a, 76b generate elastic deformation at the respective portions extending over the first and second communication holes 44, 60 in the thickness direction. This causes elastic deformation of the rubber buffer 72 to be generated in a state of keeping the volume of the inner space 74 at nearly a constant level, and the liquid pressure of the pressure-receiving chamber 66 is absorbed by the volume changes of the equilibrium chamber 68. As a result, any increase in the dynamic spring constant due to the tight closure of the pressure-receiving chamber 66 can be avoided to obtain an effective vibration isolation effect.

In summary, in the engine mount 10 of the present embodiment, the first window 82 is formed with a smaller opening area than that of the first communication hole 44 with the facing plate portion 76a extending over the opening of the first communication hole 44, while the second window 84 is formed with a smaller opening area than that of the second communication hole 60 with the facing plate portion 76b extending over the opening of the second communication hole 60. This allows volume changes of the pressure-receiving chamber 66 due to elastic deformation of the facing plate portions 76a, 76b even when the first window 82 or the second window 84 is substantially shut off due to the antiresonance and the fluid flow channel 86 is shut off at a vibration input within a range of high frequencies, thus preventing significant deterioration of the vibration damping performance caused by a rapid increase in the dynamic spring constant.

Moreover, in the present embodiment, the tuning frequencies of the first window 82 and the second window 84 are made different from each other so that elastic deformation of the facing plate portion 76a occurs at a vibration input of a higher frequency than that for the facing plate portion 76b. Therefore, the dynamic spring constant gradually increases in multiple steps to effectively prevent degradation of the vibration damping performance caused by a rapid increase in the dynamic spring constant.

Figure 13:
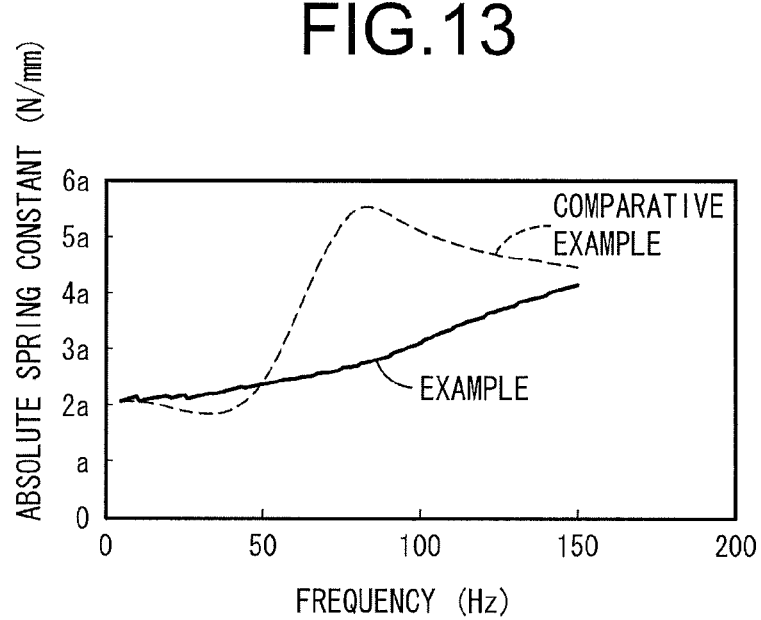
FIG. 13 is a graph showing dynamic spring characteristics of the engine mount shown in FIG. 1.

Comparing the condition where only the second window 84 is shut off as shown in FIG. 12B and the condition where both of the first and second windows 82, 84 are shut off as shown in FIG. 12C, the dynamic spring constant of the latter gets larger (stiffer spring) than that of the former due to the elasticity of the facing plate portions 76a, 76b, and since the dynamic spring constant increases continuously or in steps, rapid degradation of the vibration damping performance can be avoided. This is evident from the graph in FIG. 13 showing measured results of dynamic spring constants. As to the engine mount 10 relating to the present invention (Example) shown by a solid line, the dynamic spring constant is kept low at vibration input in a higher range of frequencies than in the case of the conventional engine mount (Comparative Example) shown by a dashed line.

In addition, the Comparative Example shows a rapid increase in the dynamic spring constant due to the antiresonance of the fluid flow channel 86 in a specific range of frequency, whereas the Example shows a gradual increase in the dynamic spring constant as the input vibration frequency shifts to a higher frequency range, thus preventing a rapid change in the dynamic spring constant. Therefore, deterioration of riding comfort resulting from a significant change in the spring characteristics can be prevented.

Figure 14:
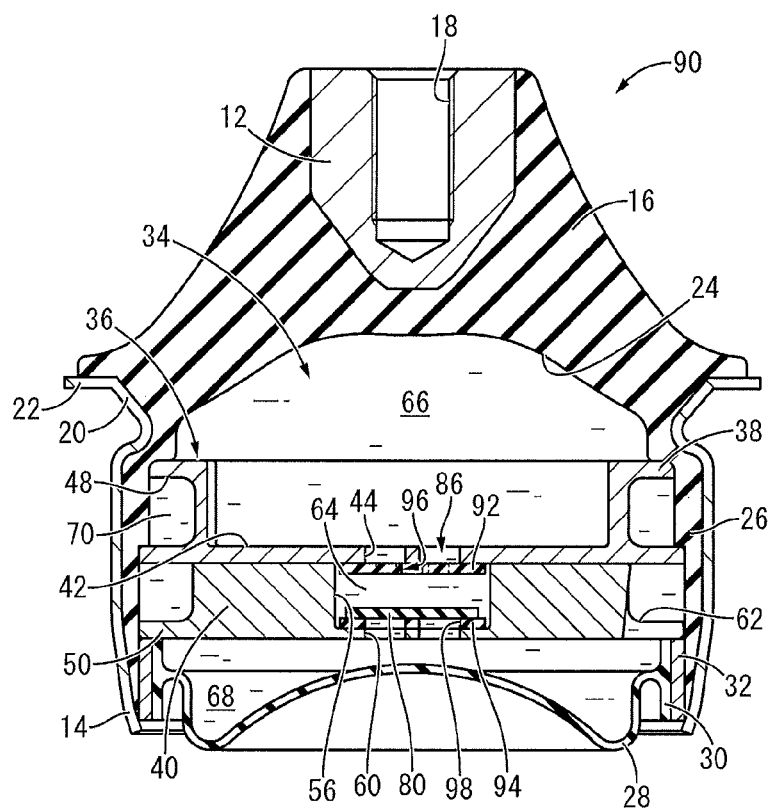
FIG. 14 is a longitudinal cross-sectional view showing an engine mount as a second embodiment of the present invention.

FIG. 14 shows an automotive engine mount 90 as a second embodiment of the fluid-filled vibration damping device with a structure according to the present invention. In the following descriptions, substantially the same members and parts as those of the above-described first embodiment are omitted by assigning the same numerals to the equivalent components in each drawing.

In other words, in the engine mount 90, a first rubber buffer 92 as an elastic buffer body is adhered to the wall inner surface of the housing space 64 on the side of the pressure-receiving chamber 66, while a second rubber buffer 94 is adhered to the wall inner surface of the housing space 64 on the side of the equilibrium chamber 68.

The first rubber buffer 92 is a rubber elastic body in an approximate shape of a thin rectangular plate and covers the wall inner surface of the housing space 64 on the side of the pressure-receiving chamber 66 by means of having its outer peripheral end bonded to the upper partition member 38. In addition, a first window 96 as a window is formed on the first rubber buffer 92 as is the case with the facing plate portion 76a of the first embodiment. The first window 96 is composed of five small-diameter circular holes independent of one another, penetrating through the first rubber buffer 92 in the thickness direction. The first rubber buffer 92 is adhered to the bottom surface of the upper partition member 38 in the present embodiment but, for example, can be supported by the partition member 36 by having its outer peripheral end sandwiched between the upper and lower partition members 38, 40. This also applies to the second rubber buffer 94 described later.

Furthermore, the five circular holes composing the first window 96 are each formed with a smaller opening area than that of the first communication hole 44 in the same way as the first embodiment, and the first rubber buffer 92 extends over the opening of the first communication hole 44. Moreover, the ratio of the opening area of the first window 96 to the penetration length thereof $(a_1/l_1)$ is made smaller than the ratio of the opening of the first communication hole 44 to the penetration length thereof $(A_1/L_1)$ and the ratio of the opening area of the second communication hole 60 to the penetration length thereof $(A_2/L_2)$. The ratio of the opening area of the first window 96 to the penetration length thereof is made smaller than the ratio of the sum of opening areas of the first and second communication holes 44, 60 to the sum of penetration lengths thereof $((A_1+A_2)/(L_1+L_2))$.

The second rubber buffer 94 is a rubber elastic body in an approximate shape of a thin rectangular plate like the first rubber buffer 92, and covers the wall inner surface of the housing space 64 on the side of the pressure-receiving chamber 66 by means of having its outer peripheral end bonded to the bottom wall of the housing space 64 in the lower partition member 40. In addition, a second window 98 is formed on the second rubber buffer 94. The second window 98 is a pair of rectangular holes in nearly the same shape as the second communication hole 60 in the axial view and the pair of rectangular holes are formed at a location corresponding to the pair of second communication holes 60, 60 at a given distance from each other in the long-side direction (left-right direction in FIG. 14) of the second rubber buffer 94. In other words, the second rubber buffer 94 is adhered to the opening edge of the second communication hole 60 without extending over the opening thereof.

In the engine mount 90 with the structure according to the present embodiment, once vibration is inputted thereto in a higher frequency than the idling vibration, a rapid increase in the dynamic spring constant is prevented by elastic deformation of the first rubber buffer 92.

That is, at an input of a small-amplitude vibration of a frequency lower than that of the first and second communication holes 44, 60 and higher than that of the first window 96, the first window 96 is substantially shut off due to the antiresonance. This allows the liquid pressure of the pressure-receiving chamber 66 to be applied to the top surface of the first rubber buffer 92 through the first communication hole 44, and at the same time allows the liquid pressure of the equilibrium chamber 68 to be applied to the bottom surface of the first rubber buffer 92 through the second communication hole 60 and the second window 98. Therefore, since the first rubber buffer 92 is elastically deformed corresponding to the fluctuations of the internal pressure of the pressure-receiving chamber 66 relative to that of the equilibrium chamber 68, the liquid pressure in the pressure-receiving chamber 66 is transmitted to the equilibrium chamber 68 to be absorbed by the volume changes thereof. Consequently, the volume changes of the pressure-receiving chamber 66 are allowed to some extent due to the elastic deformation of the first rubber buffer 92 even after the switching from the communicated state to the shut-off state of the fluid flow channel 86, thus preventing a rapid increase in the dynamic spring constant from a lower level. As a result, significant deterioration of the vibration damping performance due to the rapid increase in the dynamic spring constant is prevented, thereby obtaining the intended vibration damping performance against vibration over a broader frequency range.

As shown in the engine mount 90 of the present embodiment, the elastic buffer body having windows with a smaller opening area than that of the communication holes can be provided on the wall inner surface of the housing space 64 only on the side of the pressure-receiving chamber 66, and does not have to be provided to cover both wall inner surfaces on the sides of the pressure-receiving chamber 66 and the equilibrium chamber 68. Furthermore, the elastic buffer body can be provided to cover the wall inner surface of the housing space 64 only on the side of the equilibrium chamber 68. In addition, the first rubber buffer 92 alone can be provided by omitting the second rubber buffer 94.

Furthermore, in the present embodiment, the first and second rubber buffers 92, 94 are made in a plate shape independent of each other, but the first and second rubber buffers 92, 94 can be integrally provided. For example, in the rubber buffer 72 in a shape of a band-like cylinder shown in the first embodiment, only the facing plate portion 76a can be made to be an elastic buffer body by means of forming the first window 96 on the facing plate portion 76a and the second window 98 on the facing plate portion 76b.

Figure 15:
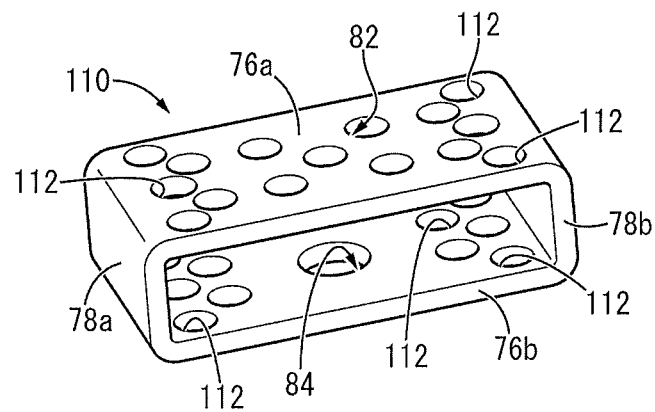
FIG. 15 is a perspective view of a rubber buffer of an engine mount as a third embodiment of the present invention.
Figure 16:
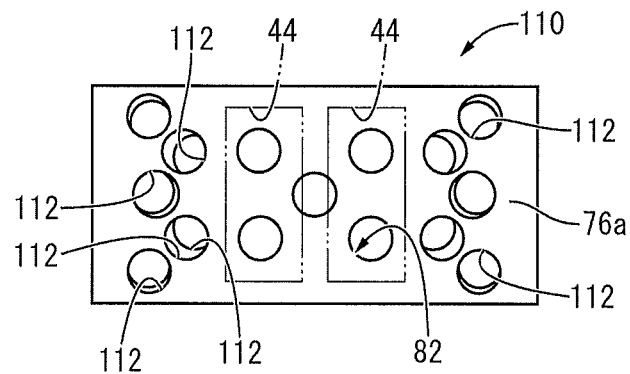
FIG. 16 is a plan view of the rubber buffer shown in FIG. 15.
Figure 17:
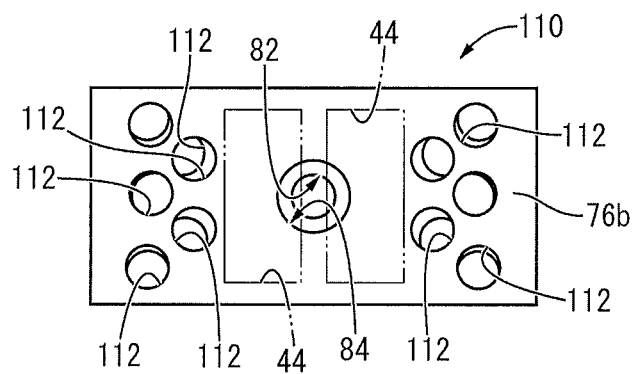
FIG. 17 is a bottom view of the rubber buffer shown in FIG. 15.

FIGS. 15 to 17 show a rubber buffer 110 as a band-like cylindrical body composing an engine mount as a third embodiment of the fluid-filled vibration damping device with the structure according to the present invention.

The rubber buffer 110, as is the case with the rubber buffer 72 of the first embodiment, has a structure where the pair of facing plate portions 76a, 76b and the pair of side plate portions 78a, 78b are integrally provided, and is made in a hollow form with the inner space 74 therein.

Also, the rubber buffer 110 of the present embodiment has the facing plate portions 76a and 76b with a plurality of lightening holes 112 each formed thereon. The lightening holes 112 penetrate through both ends of the facing plate portions 76a, 76b in the longitudinal direction and are formed at locations away from the first and second windows 82, 84 in the longitudinal direction.

Then, the rubber buffer 110 is housed in the housing space 64 of the partition member 36, and the facing plate portion 76a is overlapped in contact with the wall inner surface of the housing space 64 on the side of the pressure-receiving chamber 66, while the facing plate portion 76b is overlapped in contact with the wall inner surface of the housing space 64 on the side of the equilibrium chamber 68.

Under such a condition where the rubber buffer 110 described above is arranged in the housing space 64 (stationary state with no vibration input), the lightening holes 112 penetrating through the facing plate portions 76a, 76b are provided away from the first and second communication holes 44, 60 of the partition member 36 and covered and shut off by the walls of the housing space 64 on the sides of both the pressure-receiving chamber 66 and the equilibrium chamber 68. Needless to say, the lightening holes 112 are thus different from the first and second windows 82, 84 arranged over the openings of the first and second communication holes 44, 60 composing the fluid flow channel 86 under a condition where the rubber buffer 110 is arranged in the housing space 64, and the opening area of the lightening hole 112 is not included in the opening areas of the first and second windows 82, 84. In other words, in the elastic buffer body, a through-hole like the lightening hole 112 which is different from the window can be formed at portions not corresponding to the communication holes (portions away from the communication holes). FIG. 16 hypothetically shows the first communication hole 44 by two-dotted lines, while FIG. 17 hypothetically shows the second communication hole 60 also by two-dotted lines.

Adopting the rubber buffer 110 having the lightening holes 112 described above, weight saving of the rubber buffer 110 and reduction in the materials used for formation thereof (rubber elastic body) can be achieved. In addition, since the lightening hole 112 is formed at locations to be covered and shut off by the partition member 36 under a condition where the rubber buffer 110 is arranged in the housing space 64, the impact of the formation of the lightening holes 112 on the vibration damping characteristics can be reduced, thereby obtaining the intended vibration damping performance.

The lightening holes intended for weight saving can be formed, for example, on the pair of side plate portions 78a, 78b. Also, the number, shape and size of the lightening holes are not particularly limited.

Figure 18:
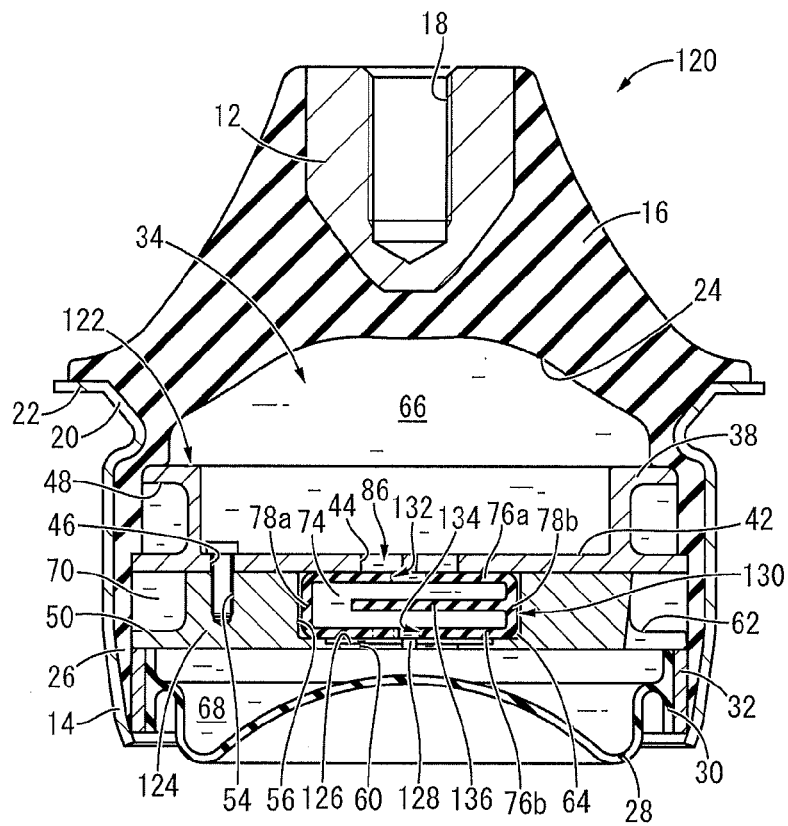
FIG. 18 is a longitudinal cross-sectional view showing an engine mount as a fourth embodiment of the present invention.

FIG. 18 shows an automotive engine mount 120 as a fourth embodiment of the fluid-filled vibration damping device with a structure according to the present invention. The engine mount 120 has a partition member 122 that separates the pressure-receiving chamber 66 from the equilibrium chamber 68, and the partition member 122 is composed of the upper partition member 38 and the lower partition member 124.

Figure 19:
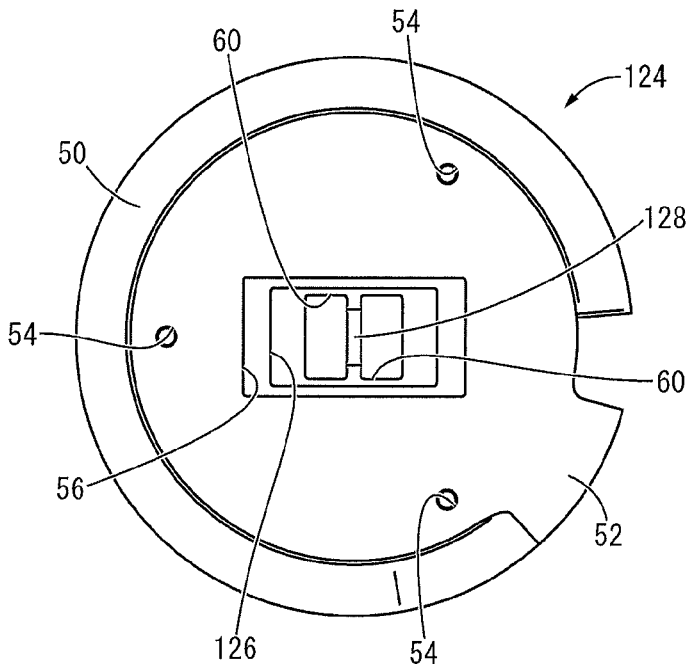
FIG. 19 is a plan view of a lower partition member of the engine mount shown in FIG. 18.

As shown in FIG. 19, the lower partition member 124 is provided with the housing concave 56 at the center thereof in the radial direction, and the pair of second communication holes 60, 60 are formed vertically penetrating through the bottom wall of the housing concave 56. Also on the bottom wall of the housing concave 56, a concave portion 126 as a concave/convex portion is formed. The concave portion 126 is a shallow concavity with an approximately rectangular cross section opening to the top surface of the bottom wall of the housing concave 56. In addition, the concave portion 126 extends to the outer peripheral side beyond the pair of second communication holes 60, 60 to be formed along the opening edges thereof. In other words, the concave portion 126 is formed on the bottom wall of the housing concave 56 opening upward and the pair of second communication holes 60, 60 are formed penetrating through the bottom wall of the concave portion 126. Moreover, a central protrusion 128 is formed protruding upward between the pair of second communication holes 60, 60 and the protrusion end face of the central protrusion 128 is located on approximately the same axis-perpendicular plane as the portion separated from the concave portion 126 on the bottom wall inner face of the housing concave 56.

Then, the partition member 122 is composed by having the lower partition member 124 overlapped with the upper partition member 38 from below and fixed thereto with screws or the like, while the opening of the housing concave 56 of the lower partition member 124 is covered by the upper partition member 38 to form the housing space 64. The concave portion 126 is formed in the housing space 64 on the wall inner surface on the side of the equilibrium chamber 68 opening inward of the housing space 64.

Also, a rubber buffer 130 is housed as an elastic buffer body in the housing space 64, and the facing plate portion 76*a* is overlapped with the wall inner surface of the housing space 64 on the side of the pressure-receiving chamber 66, while the facing plate portion 76*b* is overlapped with the wall inner surface of the housing space 64 on the side of the equilibrium chamber 68. In addition, the opening edge of the first window 132 on the facing plate portion 76*a* extends over the opening of the first communication holes 44, 44, while the opening edge of the second window 134 on the facing plate portion 76*b* extends over the opening of the second communication holes 60, 60. In the rubber buffer 130, the first window 132 is made to be a single circular hole vertically penetrating through the facing plate portion 76*a* at the center, while the second window 134 is composed of five circular holes vertically penetrating through the facing plate portion 76*b*. Furthermore, the cross-sectional area of the first window 132 is made larger than that of one of the circular holes composing the second window 134, while the cross-sectional area of the first window 132 is made smaller than the sum of the cross-sectional areas of the five circular holes of the second window 134.

Moreover, a movable film 136 as a movable member is formed integrally with the rubber buffer 130, which is arranged in the inner space 74. The movable film 136, a rubber elastic body in a shape of a thin plate, is integrally formed with the side plate portion 78*b* protruding toward the side plate portion 78*a* in a length short of reaching thereto to extend nearly parallel to the facing plate portions 76*a*, 76*b*.

Figure 20:
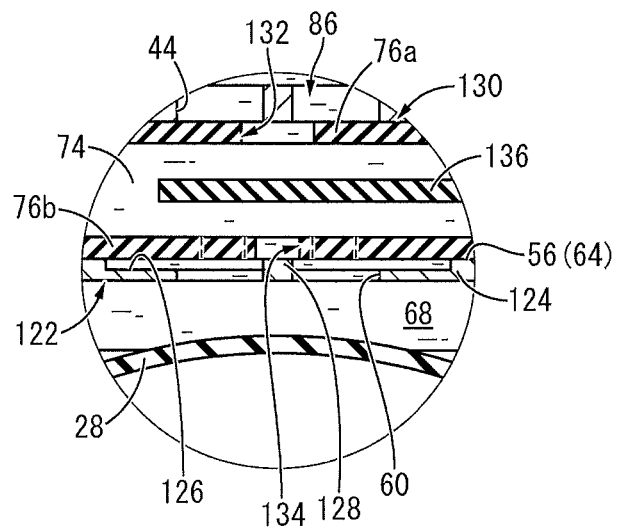
FIG. 20 is a longitudinal cross-sectional view showing an enlarged key portion of the engine mount shown in FIG. 18.

Under these circumstances, the facing plate portion 76*b* of the rubber buffer 130, as shown in FIG. 20, is separated from the wall inner surface of the housing space 64 on the side of the equilibrium chamber 68 in a stationary state (with no input of vibration) by having the concave portion 126 formed on the wall inner surface of the housing space 64 on the side of the equilibrium chamber 68. In other words, portions located above the opening edges of the second communication holes 60, 60 on the facing plate portion 76*b* are arranged so as to cover the opening of the concave portion 126, and the facing plate portion 76*b* is separated upward from wall inner surface of the housing space 64 on the side of the equilibrium chamber 68 provided with the concave portion 126 along the opening edges of the second communication holes 60, 60. This reduces the contact area between the facing plate portion 76*b* of the rubber buffer 130 and the wall inner surface of the housing space 64 on the side of the equilibrium chamber 68. The outer periphery of the facing plate portion 76*b* is supported in contact all the way around by the wall inner surface of the housing space 64 on the side of the equilibrium chamber 68, while the central portion thereof is supported in contact by the protrusion end face of the central protrusion 128, whereas the intermediate section thereof is arranged over the opening of the concave portion 126 away from the wall inner surface of the housing space 64.

In the engine mount 120 with the structure according to the present embodiment, the area of contact between the facing plate portion 76*b* of the rubber buffer 130 and the wall inner surface of the housing space 64 is made smaller due to the formation of the concave portion 126. Therefore, when the facing plate portion 76*b* undergoes elastic deformation to strike the wall inner surface of the housing space 64, the impact force caused by the contact is reduced to prevent the striking noise. Especially in the structure where the facing plate portion 76*b* extends to narrow the second communication holes 60, 60, the liquid pressures in the pressure-receiving chamber 66 and the equilibrium chamber 68 are applied to both sides of the facing plate portion 76*b* of the rubber buffer 130 so that the facing plate portion 76*b* is easily subject to elastic deformation posing a risk of generating the striking noise by contact, which can be avoided by providing the concave portion 126.

Also, since the facing plate portion 76*b* is separated from the wall inner surface of the housing space 64 along the opening edges of the second communication holes 60, 60 due to the formation of the concave portion 126, slight deformation of the facing plate portion 76*b* in the vertical direction is allowed not only in the portion extending over the opening of the second communication holes 60, 60 but also in the portion extending over the opening of the concave portion 126. Therefore, under a condition where the second window 134 is substantially shut off due to the antiresonance, restraint against the facing plate portion 76*b* by the wall inner surface of the housing space 64 is alleviated to fully allow the elastic deformation thereof so that the liquid-pressure absorption action due to the elastic deformation of the facing plate portion 76*b* is effectively exerted. As a result, the intended vibration damping effect can be obtained more favorably at a vibration input even at a higher frequency than the tuning frequency of the second window 134.

Although the engine mount 120 is shown as an example wherein the concave portion 126 is formed opening to the wall inner surface of the housing space 64 on the side of the equilibrium chamber 68, the concave portion 126 can be formed opening to the wall inner surface of the housing space 64 on the side of the pressure-receiving chamber 66, or it can even be formed opening to the wall inner surfaces on the sides of both the pressure-receiving chamber 66 and the equilibrium chamber 68.

Figure 21:
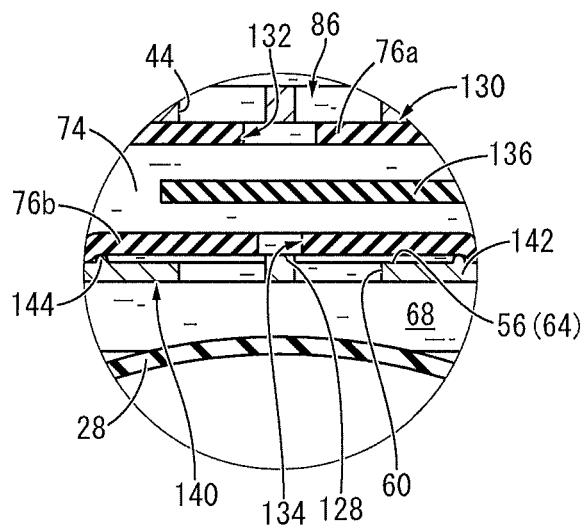
FIG. 21 is a longitudinal cross-sectional view showing a key portion of an engine mount as another embodiment of the present invention.

Also, although the engine mount 120 is exemplified with the concave portion 126 as a concave/convex portion, a convex portion can also be adopted as a concave/convex portion. More specifically, in the partition member 140 shown in FIG. 21, a convex portion 144 as a concave/convex portion is integrally formed with a lower partition member 142. From the wall of the housing space 64 on the side of the equilibrium chamber 68, the convex portion 144 protrudes inward of the housing space 64, extending around the pair of second communication holes 60, 60 in an approximate shape of an annular rectangle.

Then, by arranging the rubber buffer 130 in the housing space 64, the facing plate portion 76*b* comes in contact with the convex portion 144 in the intermediate section so as to be vertically separated upward from the wall inner surface of the housing space 64 on the side of the equilibrium chamber 68 at the inner peripheral side of the contact portion with the convex portion 144. This allows the facing plate portion 76*b* to be separated from the wall inner surface of the housing space 64 along the opening edges of the second communication holes 60, 60, allowing slight deformation of the facing plate portion 76*b* in the vertical direction in a broader range as is the case with the engine mount 120 of the fourth embodiment, thereby enabling to obtain the vibration damping effect based on the liquid-pressure absorption action more favorably under a condition where the second window 134 is substantially shut off.

Figure 22:
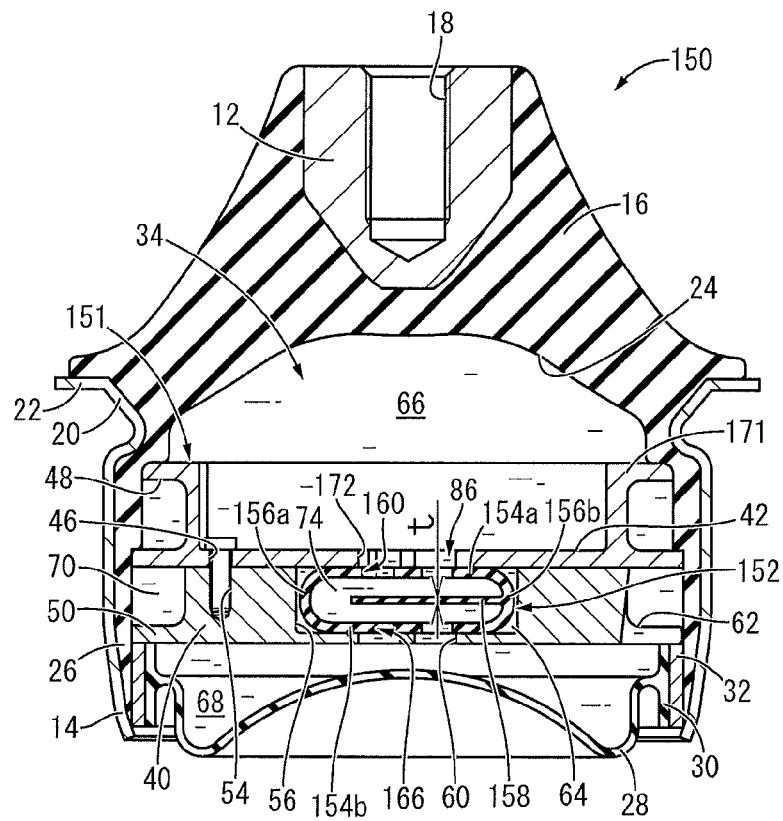
FIG. 22 is a longitudinal cross-sectional view showing an engine mount as a fifth embodiment of the present invention.

FIG. 22 shows an automotive engine mount 150 as a fifth embodiment of the fluid-filled vibration damping device with the structure according to the present invention. The engine mount 150 has a structure where a rubber buffer 152 as a band-like cylindrical body is arranged in the housing space 64 of a partition member 151.

More specifically, the rubber buffer 152 in a shape of a band-like cylinder made by endlessly connecting rubber bands is integrally provided with a pair of facing plate portions 154a, 154b as an elastic buffer body as well as a pair of side plate portions 156a, 156b that connect the facing plate portions 154a, 154b to each other at each end. The pair of side plate portions 156a, 156b are each in a shape of a plate curved in convex toward outside in the opposing direction with the distance between the opposing surfaces getting larger toward the center in the vertical direction. Also, under a condition where the rubber buffer 152 is arranged in the housing space 64, the pair of facing plate portions 154a, 154b come in contact with the wall inner surface of the housing space 64 to take an approximate shape of a flat plate, but prior to the arrangement in the housing space 64, the pair of facing plate portions 154a, 154b can be made in an approximate shape of a flat plate in the same way as under the arranged condition, or can be made in a shape of a plate curved in convex toward outside in the vertical direction.

Also, the rubber buffer 152 is integrally provided with a movable film 158 as a movable member. The movable film 158 is a plate-like rubber elastic body formed integrally with the side plate portion 156b at the center in the vertical direction, and is arranged to protrude toward the side plate portion 156a into the inner space 74. In the present embodiment, the thickness t of the movable film 158 is made smaller than the thickness of the facing plate portions 154a, 154b.

Figure 23:
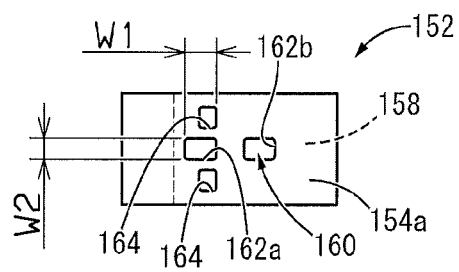
FIG. 23 is a plan view of a rubber buffer of the engine mount shown in FIG. 22.

Also, as shown in FIG. 23, a first window 160 is formed on the facing plate portion 154a. The first window 160 is composed of a pair of first larger windows 162a, 162b in nearly the same shape arranged in the longitudinal direction away from each other and a pair of first smaller windows 164, 164 arranged on both sides of the first larger window 162a on the side of the side plate portion 156a in the short-side direction. For better understanding, the first larger window on the side of the side plate portion 156a is called the first larger window 162a, whereas the first larger window on the side plate portion 156b is called the first larger window 162b.

Furthermore, in the present embodiment, the first larger window 162a/162b is made in a shape of a rounded rectangle and the length W1 of the first larger window 162a/162b in the long-side direction is made larger than the length W2 thereof in the short-side direction. The first smaller window 164 has a hole cross section also in a shape of a rounded rectangle, and the length in the short-side direction is made nearly the same as that (W2) of the first larger window 162a/162b, while the length in the long-side direction is made smaller than that in the short-side direction. Then, the first larger window 162a extends toward the side plate portion 156a beyond the first smaller windows 164, 164.

Figure 24:
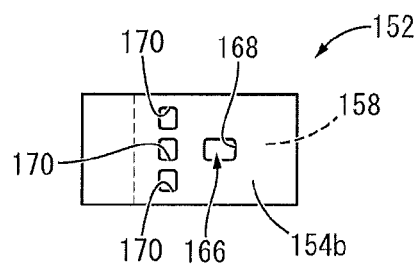
FIG. 24 is a bottom view of the rubber buffer shown in FIG. 23.

Meanwhile, as shown in FIG. 24, a second window 166 is formed on the facing plate portion 154b. The second window 166 is composed of a single second larger window 168 formed at the location corresponding to the first larger window 162b and three second smaller windows 170, 170, 170 formed at the location corresponding to the pair of first smaller windows 164, 164. In the present embodiment, since the shape and size of the second larger window 168 and the second smaller window 170 composing the second window 166 are nearly the same as those of the first larger window 162a/162b and the first smaller window 164, respectively, no description will be given herein. Also, the first window 160 and the second window 166 are arranged at locations where all of the larger windows 162a, 162b, 168 and the smaller windows 164, 170 composing the first and second windows 160, 166 overlap with the movable film 158 in the axial projection in a stationary state.

Figure 25:
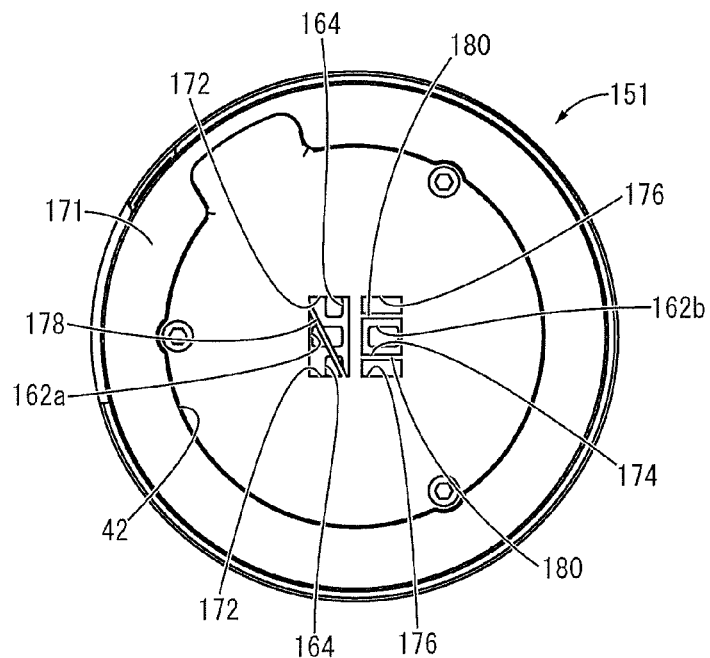
FIG. 25 is a plan view of a partition member of the engine mount shown in FIG. 22.

Then, the rubber buffer 152 is arranged in the housing space 64 of the partition member 151. The partition member 151 of the present embodiment has a structure where an upper partition member 171 and a lower partition member 40 are overlapped with each other in an approximate shape of a circular plate as a whole. The upper partition member 171, as shown in FIG. 25, has a structure where a pair of divided communication holes 172, 172, a main communication hole 174, and a pair of auxiliary communication holes 176, 176 are formed by penetration instead of the first communication holes 44, 44 of the upper partition member 38, and the communication holes of the present embodiment are composed of the pair of divided communication holes 172, 172 and the main communication hole 174.

The pair of divided communication holes 172, 172 have a structure with the first communication hole 44 divided into two sections by a crossbar 178 extending in the diagonal direction leaving the holes in shapes of right-angle triangles. The main communication hole 174 and the pair of auxiliary communication holes 176, 176 have a structure where the first communication hole 44 is divided by a pair of crossbars 180, 180 extending in the short-side direction, and the main communication hole 174 is formed between the pair of crossbars 180, 180, while each auxiliary communication hole 176 is formed outside of the pair of crossbars 180, 180. The first window 160 formed on the rubber buffer 152 opens to each of the pair of divided communication holes 172, 172, and the larger window 162a and one smaller window 164 open across both of the divided communication holes 172, 172. Also the larger window 162b formed on the rubber buffer 152 opens to the main communication hole 174 so that the main communication hole 174 is narrowed by the larger window 162b of the rubber buffer 152, while the auxiliary communication hole 176 is covered by the facing plate portion 154a of the rubber buffer 152 to be nearly shut off.

Figure 26:
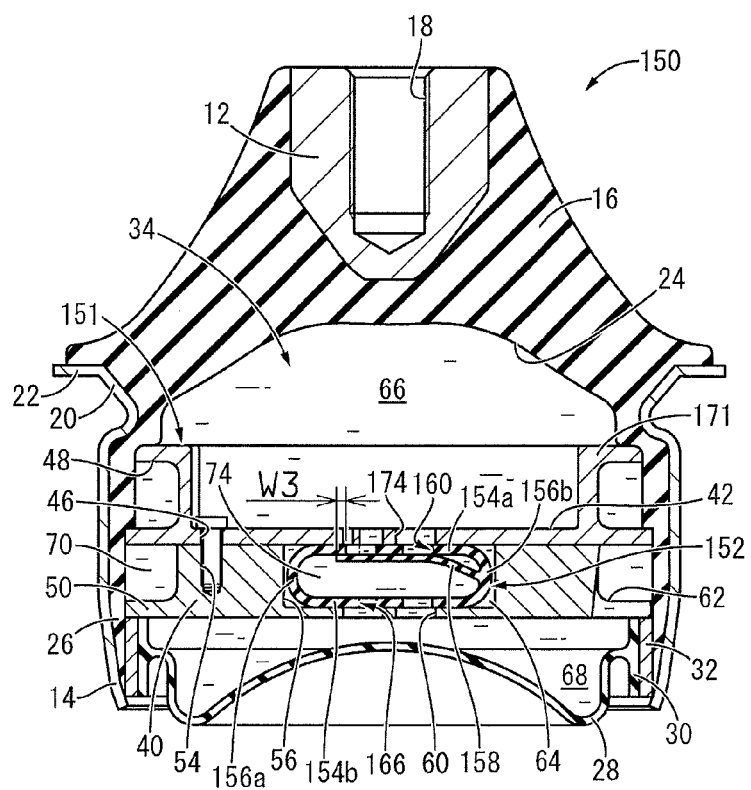
FIG. 26 is a longitudinal cross-sectional view showing a condition of the engine mount shown in FIG. 22 where a pressure in a pressure-receiving chamber is reduced by an input of a low-frequency, large-amplitude vibration equivalent to an engine shake.

In the engine mount 150 provided with the rubber buffer 152 described above, either the first window 160 or the second window 166 is shut off at a vibration input of large-amplitude vibration by the movable film 158 that was elastically deformed as shown in FIG. 26. This causes the fluid flow through the fluid flow channel 86 to be restricted to efficiently induce a fluid flow through the orifice passage 70, thus effectively exerting the vibration damping effect based on the fluid flow action. As shown in FIG. 26, under a condition where the first window 160 is shut off by the movable film 158, the tip end of the movable film 158 comes in contact with the facing plate portion 154a on the side of the side plate portion 156a of the first larger window 162a, and the length in the longitudinal direction of the tip end of the movable film 158 in contact with the facing plate portion 154a is called W3.

Figure 27:
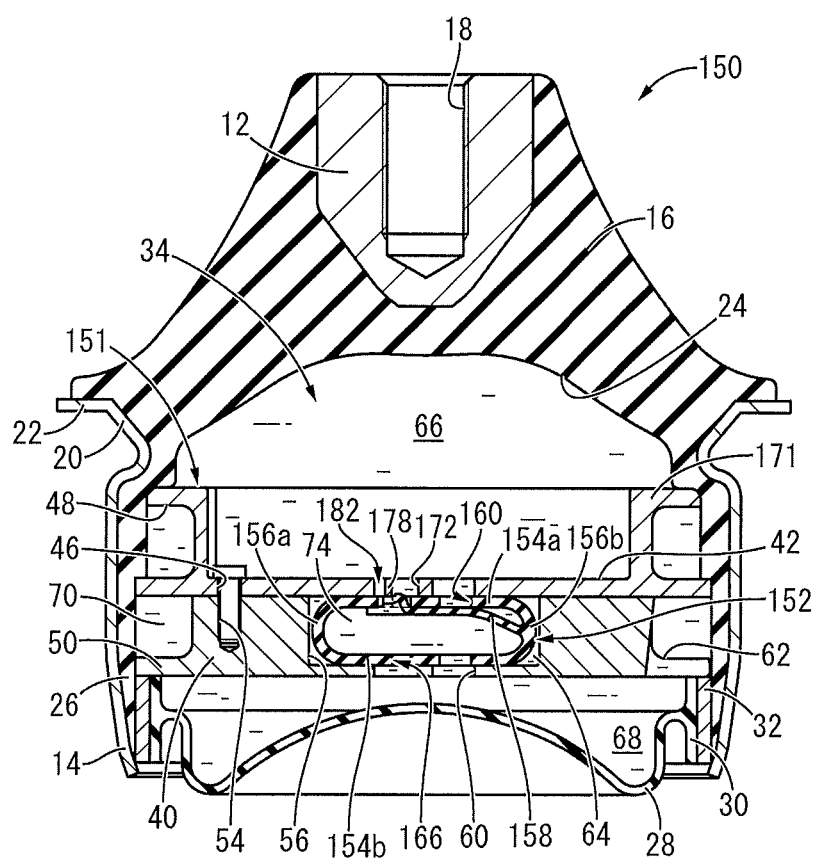
FIG. 27 is a longitudinal cross-sectional view showing a condition of the engine mount shown in FIG. 22 where the pressure in the pressure-receiving chamber is significantly reduced by an input of a large impact load to form a short-circuit passage.

In addition, at an input of such a large impact load as to generate cavitation noise, the movable film 158 is sucked more intensely toward the pressure-receiving chamber 66 due to the significant pressure drop therein. As a result, as shown in FIG. 27, the portion of the movable film 158 covering the first larger window 162a (center of the tip end in the width direction of the movable film 158) undergoes deformation as if entering into the first larger window 162a so that the inner space 74 is communicated with the pressure-receiving chamber 66 through the first larger window 162a. This allows a short-circuit passage 182 that communicates between the pressure-receiving chamber 66 and the equilibrium chamber 68 to be configured.

In summary, in the engine mount 150 relating to the present embodiment, the movable member (movable film 158) is made to be elastically deformable, and the short-circuit passage 182 that communicates between the pressure-receiving chamber 66 and the equilibrium chamber 68 with each other is formed by having the tip end of the movable film 158 that is elastically deformed by the pressure drop in the pressure-receiving chamber 66 enter into the window (first window 160) formed on the elastic buffer body (facing plate portion 154a) covering the wall inner surface of the housing space 64 on the side of the pressure-receiving chamber 66.

In the present embodiment, the elastic deformation is restricted by means of having the movable film 158 come in contact with the crossbar 178, thus preventing problems such as failure to resume the initial position due to sticking caused by excessive deformation of the movable film 158. As evident from this fact, the crossbar 178 is not necessarily limited to the one with the structure where it is provided to extend in the diagonal direction of the first communication hole 44 and dividing the first communication hole 44 into a pair of divided communication holes 172, 172, but also can extend in the long-side direction (up-down direction in FIG. 25) or the short-side direction (left-right direction in FIG. 25) of the first communication hole 44, for example. Also, if the ratio of the opening area of each divided communication hole to the opening length thereof is made larger than the ratio of the opening area of the portion of the first window opening to each divided communication hole to the opening length thereof, three or more divided communication holes can be formed with multiple crossbars.

According to the engine mount 150 with the structure described above, fluid flow is allowed from the equilibrium chamber 68 to the pressure-receiving chamber 66 through the short-circuit passage 182 so that the pressure drop of the pressure-receiving chamber 66 is reduced or eliminated as quickly as possible, thus preventing the generation of abnormal noise by cavitation. In the present embodiment, since the elastic deformation of the movable film 158 at the basal end portion is restricted by the contact with the pair of crossbars 180, 180 through the facing plate portion 154a, elastic deformation at the tip end of the movable film 158 is efficiently induced to stably form the short-circuit passage 182 with enough cross-sectional area.

Such short-circuit passage 182 is favorably achieved by having the contact length W3 with the facing plate portion 154a at the tip end of the movable film 158 made smaller than both the length W1 in the long-side direction of the first larger window 162a and the length W2 in the short-side direction thereof (W3<W2<W1 in the present embodiment), while having the thickness t of the movable film 158 made smaller than both the length W1 in the long-side direction of the first larger window 162a and the length W2 in the short-side direction thereof (t<W2<W1 in the present embodiment). This is because, if the contact length W3 or the thickness t is larger than each side length W1 and W2 of the first larger window 162a, the tip end of the movable film 158 cannot be deformed any more to enter into the first larger window 162a, rendering the formation of the short-circuit passage 182 due to elastic deformation of the movable film more difficult.

In the second window 166 formed on the facing plate portion 154a, three second smaller windows 170, 170, 170 are arranged on the tip side of the movable film 158, and the contact length with the facing plate portion 154b on the tip side of the movable film 158 from the second window 166 is maintained larger enough than W3. Therefore, even when a significant positive pressure is applied to the pressure-receiving chamber 66, the second window 166 is maintained stably in a shut-off state, thus efficiently inducing fluid flow through the orifice passage 70.

Also, at a high-frequency, small-amplitude vibration input, the intended vibration damping effect is achieved by fluid flow through the fluid flow channel 86 composed of the pair of divided communication holes 172, 172, the main communication hole 174, the pair of auxiliary communication holes 176, 176, the first window 160, the inner space 74, the second window 166, and the pair of second communication holes 60, 60. Furthermore, since the pair of divided communication holes 172, 172, the main communication hole 174, the pair of auxiliary communication holes 176, 176, and the pair of second communication holes 60, 60 are held in a communicated state up to a frequency range higher than that for the first and second windows 160, 166, the vibration damping effect caused by slight deformation of the facing plate portions 154a, 154b is effectively exerted against vibration in a higher frequency range. In addition, in the present embodiment, the divided communication hole 172, the main communication hole 174 and the auxiliary communication hole 176 in different shapes are formed on the side of the pressure-receiving chamber 66, and each opening shape of the first window 160 corresponding to these communication holes 172, 174, 176 is different from one another. Therefore, the vibration damping effect caused by slight deformation of the facing plate portion 154a is exerted with different characteristics for each portion covering the communication holes 172, 174, 176, thus achieving effective vibration damping effect over a broad range of frequencies.

Embodiments of the present invention have been described above, but the present invention is not limited to those specific descriptions. For example, the shapes of the windows (the first windows 82, 96, 132 and the second windows 84, 134) are not particularly limited, but can also be a rectangular hole and the like.

Furthermore, although the first window 82 is formed with a larger opening area than that of the second window 84 in the first embodiment, the first window 82 and the second window 84 can also be formed with the same opening area, or the first window 82 can be formed with a smaller opening area than that of the second window 84.

Also, the shape and area of the openings of the first communication hole 44 and the second communication hole 60 are not particularly limited and can be set freely depending on the required vibration damping characteristics and the like. Furthermore, the shape and area of the openings of the first communication hole 44 and the second communication hole 60 are not necessarily the same and can be different from each other. Moreover, the penetration lengths of the first communication hole 44 and the second communication hole 60 can be equal, or the penetration length of the second communication hole 60 can be longer than that of the first communication hole 44.

Also, the first embodiment shows an example of the rubber buffer 72 in a band-like cylindrical shape, but for example, the rubber buffer 72 in a bag shape with one of the openings closed can be adopted.

Also, in the embodiment described above, the movable plate 80 as a movable member independent of the partition member 36 and the rubber buffers 72, 92 is exemplified, but as a movable member, a movable film structure supported by the partition member 36 can be adopted. In case of adopting such a movable film, the end portion thereof is supported by the partition member 36, for example, by being sandwiched thereby or by being formed integrally with the side plate portion 78a/78b of the rubber buffer 72.

Also, a positioning means for positioning the rubber buffer 72 within the housing space 64 can be provided. This positioning means can be composed, for example, by providing an engaging protrusion protruding upward from the bottom wall of the housing space 64 and by inserting the engaging protrusion into an engaging hole by forming the engaging hole through the facing plate portion 76b of the rubber buffer 72.

Also, by means of providing a protrusion that protrudes outward in the axial direction on at least one of the facing plate portions 76a, 76b, the protrusion can get in contact with the wall inner surface of the housing space 64, while portions other than the protrusion can be separated away from the wall inner surface thereof. According to this configuration, the restriction against the facing plate portions 76a, 76b by the housing space 64 is avoided to efficiently allow elastic deformation, thereby more effectively achieving the reduction of the striking noise.

In addition, by means of providing an inner protrusion that protrudes inward in the axial direction on at least one of the facing plate portions 76a, 76b, the movable plate 80 can be made to come in contact with the inner protrusion first at the time of significant displacement. This way, the areas of contact with the facing plate portions 76a, 76b of the movable plate 80 get smaller in the initial contact, thus restricting the impact force at the initial contact and preventing the generation of the striking noise.

Also, in case of forming a concave/convex portion on the wall inner surface of the housing space, it is desirable that the elastic buffer body be separated from the wall inner surface of the housing space along the opening edge of the communication hole in order to efficiently cause elastic deformation of the elastic buffer body when the window is substantially in a shut-off state, but even if the elastic buffer body has a structure where it comes in contact with the wall inner surface of the housing space along the opening edge of the communication hole, the action of reducing the striking noise owing to the reduced contact area can be effectively exerted.

The present invention is not only applied to the engine mount, but can also be applied favorably to various fluid-filled vibration damping devices including a body mount, a member mount, and so forth. Also, the scope of application of the present invention is not limited to fluid-filled vibration damping devices for automobiles but also can be applied to fluid-filled vibration damping devices used for purposes other than automobiles such as motorcycles, railroad vehicles and industrial vehicles.

What is claimed is:

1. A fluid-filled vibration damping device comprising:
a first mounting member;
a second mounting member;
a main rubber elastic body elastically connecting the first and second mounting members;
a partition member supported by the second mounting member;
a pressure-receiving chamber whose wall portion is partially defined by the main rubber elastic body;
an equilibrium chamber whose wall portion is partially defined by a flexible film, the pressure-receiving chamber and the equilibrium chamber being disposed on either side of the partition member and filled with a non-compressible fluid;
an orifice passage through which the pressure-receiving chamber and the equilibrium chamber communicate with each other;
a housing space formed within the partition member;
a movable member housed in the housing space with liquid pressure of the pressure-receiving chamber applied to one side of the movable member and liquid pressure of the equilibrium chamber applied to another side of the movable member through communication holes formed in walls of the housing space respectively on sides of the pressure-receiving chamber and the equilibrium chamber; and
an elastic buffer body supported by the partition member and arranged in the housing space such that the elastic buffer body is held in contact with both of wall inner surfaces of the housing space on the sides of the pressure-receiving chamber and the equilibrium chamber so that the inner surfaces are covered by the elastic buffer body, wherein
windows are formed to penetrate the elastic buffer body at portions corresponding to the communication holes so that the communication holes formed in the respective walls on the sides of the pressure-receiving chamber and the equilibrium chamber are always narrowed by the windows of the elastic buffer body,
and
a ratio (a/l) of an opening area (a) of the windows to a penetration length (l) thereof is made smaller than a ratio (A/L) of an opening area (A) of the communication holes to a penetration length (L) thereof.

2. The fluid-filled vibration damping device according to claim 1, wherein the elastic buffer body is arranged under a condition of being in contact with and held by the wall inner surface of the housing space.

3. The fluid-filled vibration damping device according to claim 1, wherein a difference is made between the ratio of the opening area to the penetration length of the window formed on the elastic buffer body covering the wall inner surface on the side of the pressure-receiving chamber and the ratio of the opening area to the penetration length of the window formed on the elastic buffer body covering the wall inner surface on the side of the equilibrium chamber.

4. The fluid-filled vibration damping device according to claim 1, wherein the elastic buffer body comprises a pair of facing plate portions and a pair of side plate portions that connect the pair of facing plate portions to each other, the facing plate portions and the side plate portions being endlessly connected to form an integral cylindrical body, the cylindrical body being held in the housing space in a non-adhesive manner so that the pair of facing plate portions are in contact with the respective wall inner surfaces of the walls on the sides of the pressure-receiving chamber and the equilibrium chamber of the housing space.

5. The fluid-filled vibration damping device according to claim 1, wherein a concave/convex portion is provided on at least one of the wall inner surfaces of the housing space on the sides of the pressure-receiving chamber and the equilibrium chamber, and a contact area is made small between the wall inner surface of the housing space provided with the concave/convex portion and the elastic buffer body.

6. The fluid-filled vibration damping device according to claim 5, wherein the elastic buffer body is separated by the concave/convex portion from the wall inner surface of the housing space along opening edges of the communication holes.

7. The fluid-filled vibration damping device according to claim 4, wherein the movable member comprises a movable rubber film of a thin plate shape that is integrally formed with one of the side plate portions protruding toward another of the side plate portions in a length short of reaching thereto extend parallel to the facing plate portions.

8. The fluid-filled vibration damping device according to claim 1, wherein at least one of the communication holes is provided with a crossbar extending between portions on a rim of the at least one of the communication holes.

* * * * *